United States Patent
Kuwahara et al.

(10) Patent No.: US 8,619,690 B2
(45) Date of Patent: Dec. 31, 2013

(54) CELLULAR RADIO COMMUNICATION SYSTEM, RADIO BASE STATION APPARATUS AND RADIO TERMINAL UNIT

(75) Inventors: Mikio Kuwahara, Yokohama (JP); Hajime Kanzaki, Yokohama (JP); Kenichi Azuma, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 12/961,707

(22) Filed: Dec. 7, 2010

(65) Prior Publication Data

US 2011/0158190 A1  Jun. 30, 2011

(30) Foreign Application Priority Data

Dec. 9, 2009  (JP) .................... 2009-279136

(51) Int. Cl.
*H04W 72/04* (2009.01)
(52) U.S. Cl.
USPC ........................................................ 370/329
(58) Field of Classification Search
USPC ................................................ 370/254–340
See application file for complete search history.

(56) References Cited

U.S. PATENT DOCUMENTS

| | | | | |
|---|---|---|---|---|
| 7,962,091 | B2* | 6/2011 | Oyman et al. ............... | 455/7 |
| 2008/0285524 | A1 | 11/2008 | Yokoyama | |
| 2009/0219876 | A1* | 9/2009 | Kimura et al. .............. | 370/329 |
| 2010/0048218 | A1* | 2/2010 | Gale et al. ................... | 455/450 |
| 2010/0272077 | A1* | 10/2010 | van Rensburg et al. ...... | 370/336 |

FOREIGN PATENT DOCUMENTS

| | | |
|---|---|---|
| JP | 07-087011 | 3/1995 |
| JP | 2007-243258 | 9/2007 |
| JP | 2009-021787 | 1/2009 |
| JP | 2009-044397 | 2/2009 |
| WO | WO 2007/091317 | 8/2007 |
| WO | WO 2009/099076 | 8/2009 |

OTHER PUBLICATIONS

JP Office Action for Japanese Application No. 2009-279136, issued on Apr. 2, 2013.
3GPP TS 36.331 v8.6.0 (Jun. 2009), "$3^{rd}$ Generation Partnership Project; Technical Specification Group Radio Access Network; Evolved Universal Terrestrial Radio Access (E-UTRA) Radio Resource Control (RRC); Protocol Specification (Release 8)," 2009.
"Mobile Wimax-Part I: A Technical Overview and Performance Evaluation," Wimax forum, 2006.
"The Draft IEE802.16m System Description Document," 2009, IEE 802.16m-08/003r7.

(Continued)

*Primary Examiner* — Ayaz Sheikh
*Assistant Examiner* — Debebe Asefa
(74) *Attorney, Agent, or Firm* — Antonelli, Terry, Stout & Kraus, LLP.

(57) ABSTRACT

In a cellular radio communication system including of multi-antenna base stations, to make effective use of the reduced interference in supposing the use of beam form and avoid the interference in an adjacent station even if a space multiplex and the beam form are mixed. Frequencies intended for the cell edge in an FFR are classified into frequencies for space multiplex and a frequency for beam form. Thereby, a frequency at which the interference is reduced by the beam form is fixed. A frequency intended for the cell center is in a frequency band and signals are transmitted from three base stations.

17 Claims, 19 Drawing Sheets

(56) References Cited

OTHER PUBLICATIONS

3GPP TS 36.213 v8.7.0 (May 2009), 3rd Generation Partnership Project; Technical Specification Group Radio Access Network; Evolved Universal Terrestrial Radio Access (E-UTRA); Physical Layer Procedures (Release 8), 2009.

Hitachi, Ltd., "Hitachi's Proposals on Physical Layer Aspects for LTE-Advanced," 3GPP TSG RAN Working Group 1, 2008.

* cited by examiner

CELLULAR RADIO COMMUNICATION SYSTEM, RADIO BASE STATION APPARATUS AND RADIO TERMINAL UNIT

BACKGROUND OF THE INVENTION

1. Field of the Invention

The present invention relates to a cellular radio communication system, a radio base station apparatus and a radio terminal unit, and more particularly to a cellular radio communication system, a radio base station apparatus and a radio terminal unit having a mechanism for relieving the influence of interference even in a boundary area between the radio base stations in which a plurality of radio base stations cooperate and the quality of signal may be possibly degraded due to interference of the signals sent by the plurality of radio base stations.

2. Description of the Related Art

1. Cellular Communication

In the mobile radio communication, a cellular system is generally used to enable a mobile terminal and a base station to communicate in a service area extending as a plane. In the cellular system, a plurality of base stations are scattered in the service area, and a planar cover area is established by connecting the areas (terminal communicable areas) covered by the base stations. Each base station sends a reference signal for enabling self-station to be recognized. The reference signal is designed to be unique in the region in terms of signal series to be sent, sending time or frequency, or a combination of the signal series, the time and the frequency. The terminal receives the unique reference signals sent by each base station, and grasps a radio state with the plurality of base stations adjacent to the self-station by measuring and comparing respective strengths. Those measurement results of the radio state are used to search for the base station with greater signal strength and providing a more excellent reception state (probably in the shortest propagation distance). If it is judged that the base station providing the most excellent reception state is changed from a currently connecting base station to the other adjacent base station, hand-over of switching a connection to the base station expected to implement more excellent reception state is performed to realize the cellular communication.

FIG. 1 shows a configuration view of a radio communication system.

A concept of the cellular communication will be described below again, using FIG. 1. In the cellular communication, a plurality of base stations (20, 21, and 22) exist as shown in FIG. 1. A terminal 1 makes a radio communication with the base station 20. Each base station is connected to a network apparatus 50 to secure a wire communication path. The network apparatus 50 connected to the plurality of base stations is IP connected via a packet switch device 40. In the figure, the terminal 1 is communicating with the base station 20 located in the shortest distance and capable of receiving an excellent signal. Each base station (20, 21, and 22) sends the reference signal of its own identification signal. The terminal 1 receives the reference signal sent by each base station, and measures its reception strength. The base station at which the reception strength of the reference signal is the strongest is determined as the base station located in the shortest distance. In the figure, a downstream line signal (communication from the base station to the terminal) 30 and an upstream line signal (communication from the terminal to the base station) 31 are illustrated. The base station 20 sends the downstream signal 30, the base station 21 sends a downstream signal 32 and the base station 22 sends a downstream signal 33. Since each base station sends the signal at the same frequency and at the same time, there is possibility that the downstream signals 30, 32 and 33 interfere with each other. The terminal 1 located on a cell edge (a cell boundary) receives the desired signal 30 from the base station 20, but concurrently receives the interference waves 32 and 33 from the other stations and is affected by them. A ratio of interference power and noise power to a desired signal power is called a Signal Interference and Noise Power (SINR). On the cell edge, the interference from other cells is stronger and becomes a dominant term of the denominator, whereby the SINR is degraded and it is often difficult to convey the information at high throughput.

2. Fractional Frequency Reuse (FFR)

As a method for reducing the interference on the cell edge, an FFR is well known (refer to JP-A-2009-21787, JP-A-2009-44397, 3GPP TS36.331, 6.3.2 Radio resource control information elements, Mobile WiMAX-Part1 A Technical Overview Performance Evaluation, 4.2 Fractional Frequency Reuse, IEEE 802.16m System Description Document (IEEE 802.16m-08/003r7) 20.1 Interference Mitigation using Fractional Frequency Reuse, and 3GPP TS36.213, 5.2 Downlink power allocation). The FFR is performed in a multiplex system intended for a wide band communication such as an Orthogonal Frequency Division Multiplex Access (OFDMA). The FFR grasps whether the terminal is "located on the cell edge" or "located in the cell center", and imposes restrictions on an assigned frequency depending on the location. Also, a sending power is changed with the assigned frequency. The assignment is controlled so that the frequencies used by the terminals located on the cell edge may not be equal, whereby the interference given to the surrounding cells is controlled in a frequency domain.

FIG. 2 shows a frequency use method for three base stations adopting the FFR. There are three base stations 20, 21 and 22, in which a horizontal axis indicates the frequency. A vertical axis indicates a signal power sent at each frequency. In the three base stations, a frequency band 60 is sent by weak sending power from all the base stations. Since all the base stations send the signal at this frequency, a frequency reuse ratio is 1. In this case, it is also called a reuse 1. This frequency band 60 is assigned to the terminals located in the cell center (distributed near the base station). Since an object of use is the terminal located in the cell center, a propagation loss of the signal sent from the desired base station is small, even if the sending power is weak, whereby the signal is received with high power. Also, the interference caused by the adjacent base station follows a longer propagation distance than the desired wave, and has a greater propagation loss than the desired wave, with its influence less significant. Therefore, the excellent signal quality is easily obtained.

At frequencies 61, 62 and 63, each of the three base stations sends the signal only at the frequency designated by itself, and does not send the signal at the other frequencies. In the case where the repetitive use is 3 as shown in the figure, it is also called reuse 3. This frequency band is assigned to the terminal on the cell edge. The object of use is the terminal on the cell edge, which is more susceptible to the interference from the adjacent cell, but because the adjacent cell repetitively uses the three different frequencies, or has the reuse 3, as described above, the influence of the interference wave is smaller.

FIG. 3 shows one example of the cellular communication composed of a plurality of cells. In this example, six base stations having the reference numerals 20, 21, 22, 23, 24 and 25 are illustrated. The base station 20 covers areas 100 and 101. The frequency 60 as shown in FIG. 2 is assigned to the terminal located in the area 100 in the cell center. A frequency 61 is assigned to the terminal located in the area 101. Also, in the adjacent base station 21, the frequency 60 as shown in FIG. 2 is assigned to the terminal located in an area 110 in the cell center. A frequency 62 is assigned to the terminal located in an area 111. Similarly, in the adjacent base station 22, the frequency 60 as shown in FIG. 2 is assigned to the terminal located in an area 120 in the cell center. A frequency 63 is assigned to the terminal located in an area 121.

On the boundaries of the areas 101, 111 and 121, the frequency 61 is used in the area 101, the frequency 62 is used in the area 111, and the frequency 63 is used in the area 121, whereby the same frequency is not used between the adjacent base stations. Accordingly, the influence of interference is greatly reduced.

3. Fractional Transmission Power Control (FTPC)

In the OFDMA, the frequency is divided into strips called a sub-carrier, using the FFT. Each base station enables a specific terminal to occupy a sub-channel (or also called a resource block) collecting a plurality of sub-carriers by scheduling in making the communication. Therefore, among the terminals belonging to the same cell, only one terminal can use a certain frequency (or sub-channel or resource block), whereby the interference using the same sub-channel in principle does not occur. This is a difference from a Code Division Multiplex Access (CDMA) technique. Its conceptual view is shown in FIG. 4.

FIG. 4 is a view for explaining the interference in performing the OFDMA. In this figure, the base stations 20 and 22 are present, and terminals 4 and 5 belong to the same sector. A terminal 3 belongs to the same base station but the adjacent sector. A terminal 2 belongs to the sector of the adjacent base station. When the terminal 4 sends the signal upstream, the base station 20 specifies beforehand the sub-channel available to the terminal 4. Also, the different sub-channel is specified for the terminal 5. Accordingly, the terminals 4 and 5 may send the signals at the same time, but use the different frequencies for use in the communication, whereby the signals sent by the two terminals do not interfere with each other. On the other hand, since the terminals 2, 3 and the terminals 4, 5 are the terminals belonging to the different sectors and cells, they may possibly use the same sub-channels as the terminals 4 and 5 in the upstream transmission to make the communication. Accordingly, the interference occurs in this case. In this way, the interference in the upstream communication does not occur between the terminals belonging to the same sector, but the interference between the terminals may occur in the different cells or sectors.

The terminal located in the cell center has a short distance to the base station for communication, and does not need to send the signal with high sending power. Also, the terminal has a long distance to the adjacent cells, and therefore has small interference with the other cells even if it sends the signal with high sending power. On the other hand, the terminal located on the cell edge has a long distance to the base station for communication, and needs to send the signal with high sending power. Also, it has a near distance to the adjacent station and great interference with the other cells.

Therefore, in a system adopting the OFDMA, the terminal near the base station has almost no influence on the interference, even if the power received by the base station is set to be slightly higher. Therefore, a method for controlling the sending power so that the received power at a receiving end of the base station may be increased in accordance with an estimated propagation loss is used (refer to 3GPP TS36.213, 5.1 Uplink power control). This is called an FTPC.

4. Interference Control with Beam Form

In JP-A-2007-243258 or 3GPP R1-081827, a method for avoiding the interference is disclosed in which the base station for beam forming changes a beam pattern depending on the frequency, and randomizes the interference occurring between the adjacent stations in the frequency domain, each terminal reports its interference situation at each frequency to the base station, and the base station performs a scheduling of frequency assignment to avoid the interference.

However, in any of the documents, selection of beam formation is realized over the given entire system band, without consideration for combination with the FFR.

SUMMARY OF THE INVENTION

In the cellular communication using the OFDMA as introduced in the related art, a technique for introducing the FFR to avoid the interference is well known. Also, it is well known to realize the FTPC to avoid the upstream interference. Also, another method for randomizing a selection of beam to send at the frequency, and allowing the terminal to report the interference situation at each frequency to avoid the interference according to that information is well known. However, with the related art, the randomization of the interference with the beam formation is implemented over the given entire system band, without consideration for the combination with the FFR. If the FTPC is performed, a reduction in an upstream throughput is seen on the cell edge, but it is required to report the rich channel information to relieve the interference between the cells on the cell edge. Since the reduction in the upstream throughput is seen on the cell edge as described above, a mechanism for reducing an overhead is required.

Also, in the related art for reducing the interference between the cells by randomizing the beam, if there occurs a distribution in which the terminal is deviated in the specific direction, the efficiency is often degraded, because the beam pattern is half fixed and it is difficult to freely change the beam scheduling.

Also, considering a Multi-Input Multi-Output (MIMO) communication, a method for forming a fine beam like a chrysanthemum flower by separating an antenna interval is effective, rather than a system that constructs a wide beam as introduced in JP-A-2007-243258.

In the light of the above-mentioned problems, an object of the invention is to enhance the effect of the FFR, avoid the interference and increase the use efficiency at the frequency used by the terminal on the cell edge by separating the frequency band of beam forming and the frequency band of space multiplex in accordance with the situation. Also, another object of the invention is to provide a cellular radio communication system, a radio base station apparatus and a radio terminal unit in which the FFR and the beam forming are combined to be applicable if the antenna interval is separated as described above.

The above objects can be accomplished by providing a cellular radio communication system comprising a radio base station apparatus for sending a beam dividing a space using a plurality of antennas and a plurality of radio terminal units, wherein a system frequency band is divided to prepare a first frequency band assigned to the radio terminal unit in the cell center, a second frequency band, assigned to the radio terminal unit on the cell edge, for sending the same signal with an array weight multiplied from at least two or more antennas, and a third frequency band, assigned to the radio terminal unit on the cell edge, for sending a different signal from each antenna, in which the information to be sent in the above frequency bands is prescribed in accordance with a state of each radio terminal unit.

Also, in the cellular radio communication system, the radio base station apparatus and the radio terminal unit, a Channel Quality Indicator (CQI) mode from the terminal unit is changed depending on the three frequency bands.

In the cellular radio communication system, the radio base station apparatus and the radio terminal unit, the change of the CQI mode is judged from an upstream propagation path situation and a message to be notified to the radio terminal unit is generated.

Further, in the cellular radio communication system, the radio base station apparatus and the radio terminal unit, a message for notifying a designation of a narrow band CQI mode as the CQI mode to the terminal unit is generated, when using the second frequency band.

According to the first solving means of the present invention, there is provided a cellular radio communication system comprising a radio base station apparatus for sending a beam dividing a space using a plurality of antennas and a plurality of radio terminal units, each radio base station apparatus, dividing a system frequency band and providing:

(1) a first frequency band assigned to the radio terminal unit in the cell center;

(2) a second frequency band, assigned to the radio terminal unit on the cell edge, for making a beam form transmission of sending the same signal with an array weight multiplied to the plurality of radio terminal units from at least two or more antennas, using a beam form of sending a strong signal in a specific direction and sending no strong signal in the other directions; and (3) a third frequency band, assigned to the radio terminal unit on the cell edge, for making a space multiplex transmission of sending a different or independent signal from each of at least two or more antennas to the same radio terminal unit or the plurality of radio terminal units, using a space multiplex or a diversity;

wherein each radio base station apparatus specifies the information to be sent in any of the first to third frequency bands in accordance with a state of each radio terminal unit.

According to the second solving means of the present invention, there is provided a base station apparatus in a cellular radio communication system comprising the radio base station apparatus for sending a beam dividing a space using a plurality of antennas and a plurality of radio terminal units, the radio base station apparatus, dividing a system frequency band and providing:

(1) a first frequency band assigned to the radio terminal unit in the cell center;

(2) a second frequency band, assigned to the radio terminal unit on the cell edge, for making a beam form transmission of sending the same signal with an array weight multiplied to the plurality of radio terminal units from at least two or more antennas, using a beam form of sending a strong signal in a specific direction and sending no strong signal in the other directions; and (3) a third frequency band, assigned to the radio terminal unit on the cell edge, for making a space multiplex transmission of sending a different or independent signal from each of at least two or more antennas to the same radio terminal unit or the plurality of radio terminal units, using a space multiplex or a diversity; and specifying the information to be sent in any of the first to third frequency bands in accordance with a state of each radio terminal unit.

According to the third solving means of the present invention, there is provided a radio terminal unit in a cellular radio communication system comprising a radio base station apparatus for sending a beam dividing a space using a plurality of antennas and the plurality of radio terminal units, by each radio base station apparatus, dividing a system frequency band and providing:

(1) a first frequency band assigned to the radio terminal unit in the cell center;

(2) a second frequency band, assigned to the radio terminal unit on the cell edge, for making a beam form transmission of sending the same signal with an array weight multiplied to the plurality of radio terminal units from at least two or more antennas, using a beam form of sending a strong signal in a specific direction and sending no strong signal in the other directions; and (3) a third frequency band, assigned to the radio terminal unit on the cell edge, for making a space multiplex transmission of sending a different or independent signal from each of at least two or more antennas to the same radio terminal unit or the plurality of radio terminal units, using a space multiplex or a diversity; and wherein the radio terminal unit receives a signal sent from the radio base station in any of the first to third frequency bands, by instruction from the radio base station determined in accordance with a state of each radio terminal unit.

With the invention, at the frequency used by the terminal unit on the cell edge, a frequency band of beam forming in which a plurality of radio base stations are easy to cooperate and a frequency band of space multiplex in which they are difficult to cooperate are separated in accordance with its situation, whereby it is possible to enhance the effect of the FFR, avoid the interference and increase the use efficiency.

DETAILED DESCRIPTION OF THE PREFERRED EMBODIMENTS

Figure 1:
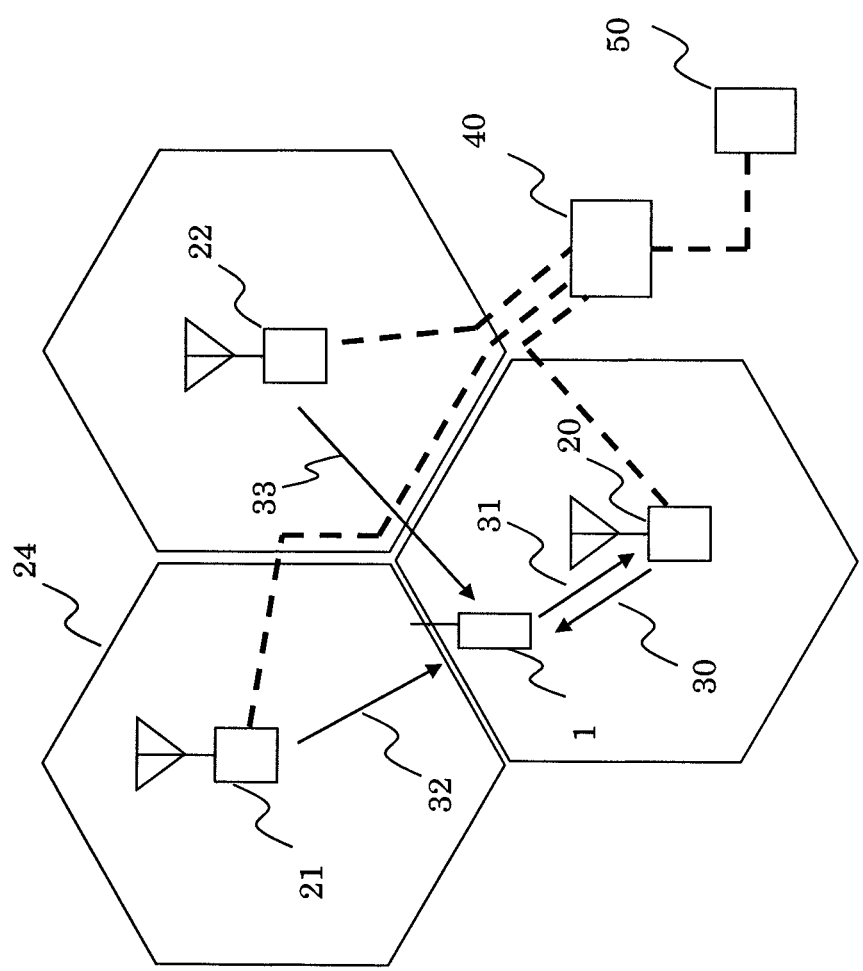
FIG. 1 is a configuration view of a radio communication system.

1. Sending Method in the Cell Center and on the Cell Edge

In the fourth generation communication, a base station having four or more antennas has been mainly proposed. For example, in the LTE-Advanced (Long Term Evolution) discussed in the 3GPP (The Third Generation Project Party) of a standardization organization, or the IEEE802.16m discussed in the IEEE (The Institute of Electrical and Electronics Engineers, Inc.), it has been proposed that the base station comprises up to eight antennas. In such a system having multiple antennas, a way of using excess antennas is important, considering that the terminal side can mount at most four antennas because of its physical size.

Using an FFR technology as conventionally known, the terminal near the cell edge and the terminal in the cell center are distinguished. For the terminal located on the cell edge, the frequency and the sending power are restricted to avoid a problem with the interference with the adjacent cells or sectors. In this invention and/or embodiment, it is a feature that particularly the terminals located on the cell edge are further classified into two kinds, and the frequencies to be used are separately employed. For the two divided frequencies, a sending method using multiple antennas is changed for each frequency. The following two sending methods are provided.

(1) Space multiplex (SM: Spatial Multiplexing) transmission:

Mechanism of connecting a plurality of users, for each of which eight antennas transmit independent signals as an MIMO transmission (2) Beam form (BF: Beam Forming) transmission Mechanism of transmitting the same information from a plurality of antennas with an appropriate array antenna weight It is possible to control the interference with the adjacent cells by using properly these two different sending methods at different frequencies. A point of the invention and/or the embodiment is particularly found here.

In the beam form transmission, a dispersion in the signal sending direction appears owing to an operation of an array antenna, whereby a strong signal is transmitted in a specific direction, but no strong signal is transmitted in the other directions. That is, a directivity of the array antenna appears in addition to the directivity of the antenna. Therefore, a phenomenon occurs that in performing the beam form, a specific terminal located in a specific bearings as seen from a base station performing the beam form and connected to an adjacent base station is subjected to strong interference, but the terminals located in the other bearings are hardly subjected to interference.

If each base station controls a resource for sending the signal with the beam form to be maintained in a certain time period, the interference in the relevant resource can be stabilized for a relatively long time at the terminal connected to the adjacent base station.

In this case, a strength of interference from the adjacent cell is grasped, based on the feedback information from the terminal, at the adjacent base station, and for the terminal in which it is known that there is only weak interference, if the data transmission can be made with a positively high Modulation and Coding Scheme (MCS) in the relevant resource, the use efficiency of frequency can be increased.

However, for the terminal moving at high speed, for example, the array weight of the array antenna must be updated to follow its movement, and even though it can be judged that the terminal connected to the adjacent base station is not subjected to the interference in the resource assigned to the terminal moving at high speed at a certain time, the array weight for sending the signal to the terminal moving at high speed is updated with the passage of a short time, to change the directivity, the previously obtained information of being less subject to interference becomes meaningless.

Therefore, in the invention and/or embodiment, a second frequency band (see reference numerals 902, 903 and 904 in FIG. 6) is created in which the control of interference to the adjacent station is abandoned, or the control of interference or beam forming is not performed, whereby the terminal moving at high speed or the terminal involving in the space multiplex transmission employs the second frequency band. Also, in the above second frequency band, a reuse ratio is set to 1 or greater so that the use frequency may not overlap with the adjacent station. Thereby, the interference itself is made less likely to occur. In the following, the embodiment of the invention will be described below in detail.

Figure 16:
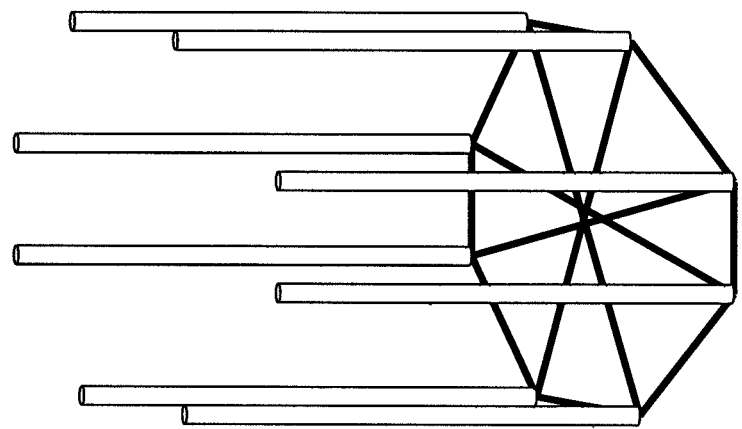
FIG. 16 is a view showing a configuration example of an array antenna.
Figure 16:
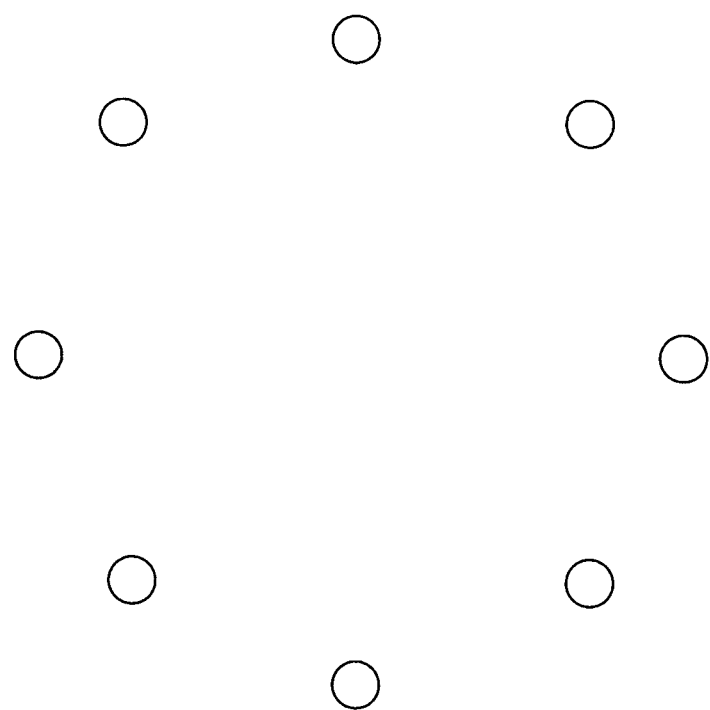

FIG. 16 shows a configuration example of an array antenna in which eight non-directional antennas are arranged at the vertices of an octagon. The left figure shows an arrangement when the antennas are seen from the above. There are eight points on the circumference of a circle, each showing the arrangement of antenna. The right figure is a configuration view when the antennas are seen from the side. Each antenna element is like a rod, and mounts a plurality of dipole antennas. In this embodiment, the distance between the center and a antenna element is set to $3\lambda$, for example. Herein, $\lambda$ is a wavelength at a carrier frequency.

Figure 5:
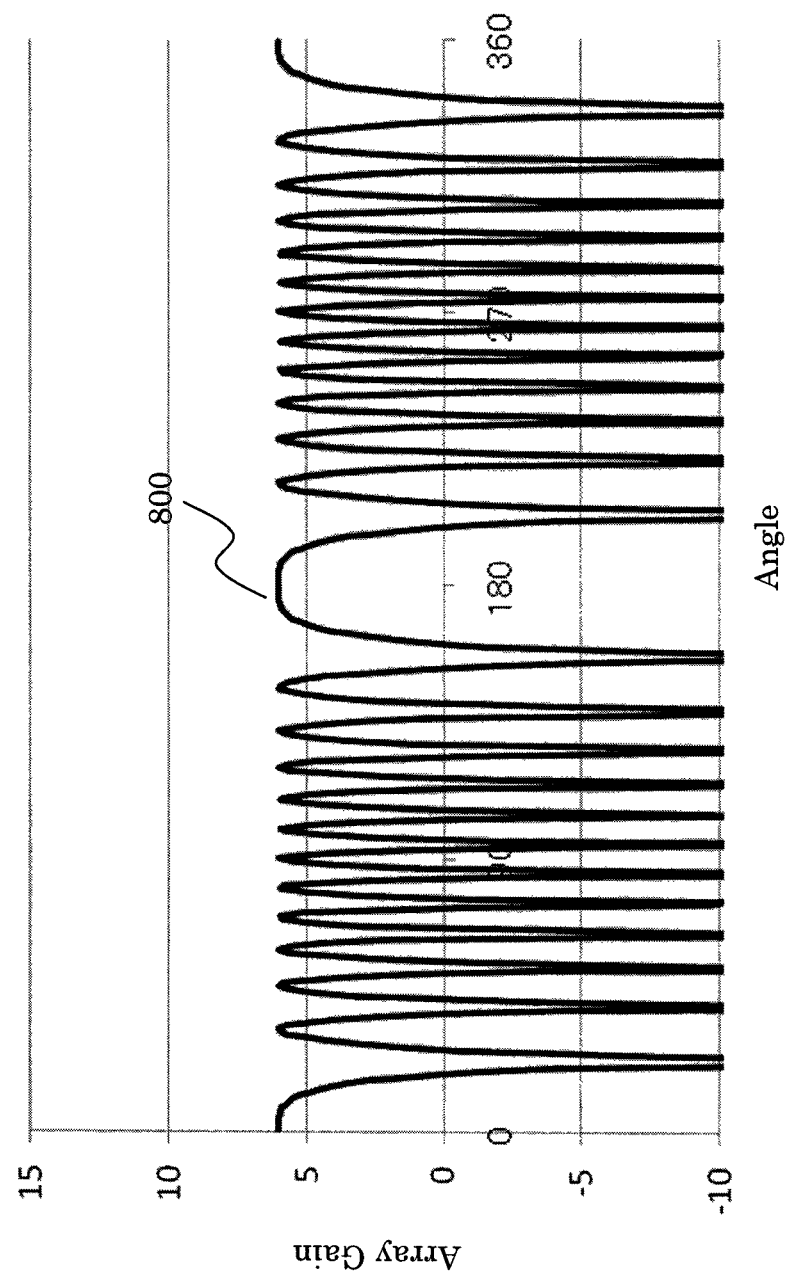
FIG. 5 is a view showing an example of beam forming.

FIG. 5 is a view showing an example of beam forming according to a first embodiment of the invention. A horizontal axis represents an angle, making an angle of 360° from left end to right end. A vertical axis indicates an array gain. The array gain means an additional gain occurring when electric wave is synthesized in the case where a plurality of antennas are combined. This directivity indicates the array gain in preparing the antenna as shown in FIG. 16, taking out two antenna elements located diagonally and using them. Signals transmitted from the two antenna elements for use have the same information and are in phase. Since the antenna interval is wider than the wavelength, the formed beam becomes very narrow, as shown in this figure. Also, it is a feature that the signal is not transmitted only in a specific direction, but a plurality of peaks of identity called a grating lobe appear in a plurality of directions. The direction where electric wave does not fly can be also confirmed. For example, the direction where the electric wave does not fly is in the range of angle from a few to several tens degrees, but if the distance between the base station and the terminal extends to several hundreds meters, the direction where no interference occurs in an area as large as several tens meters around the terminal. If the terminals for beam forming, not moving at high speed, are gathered at a specific frequency, it is easier to predict the interference between the base stations, making it possible to enhance the cooperative effect between the base stations. This is one of the points in the invention and/or embodiment.

Figure 6:
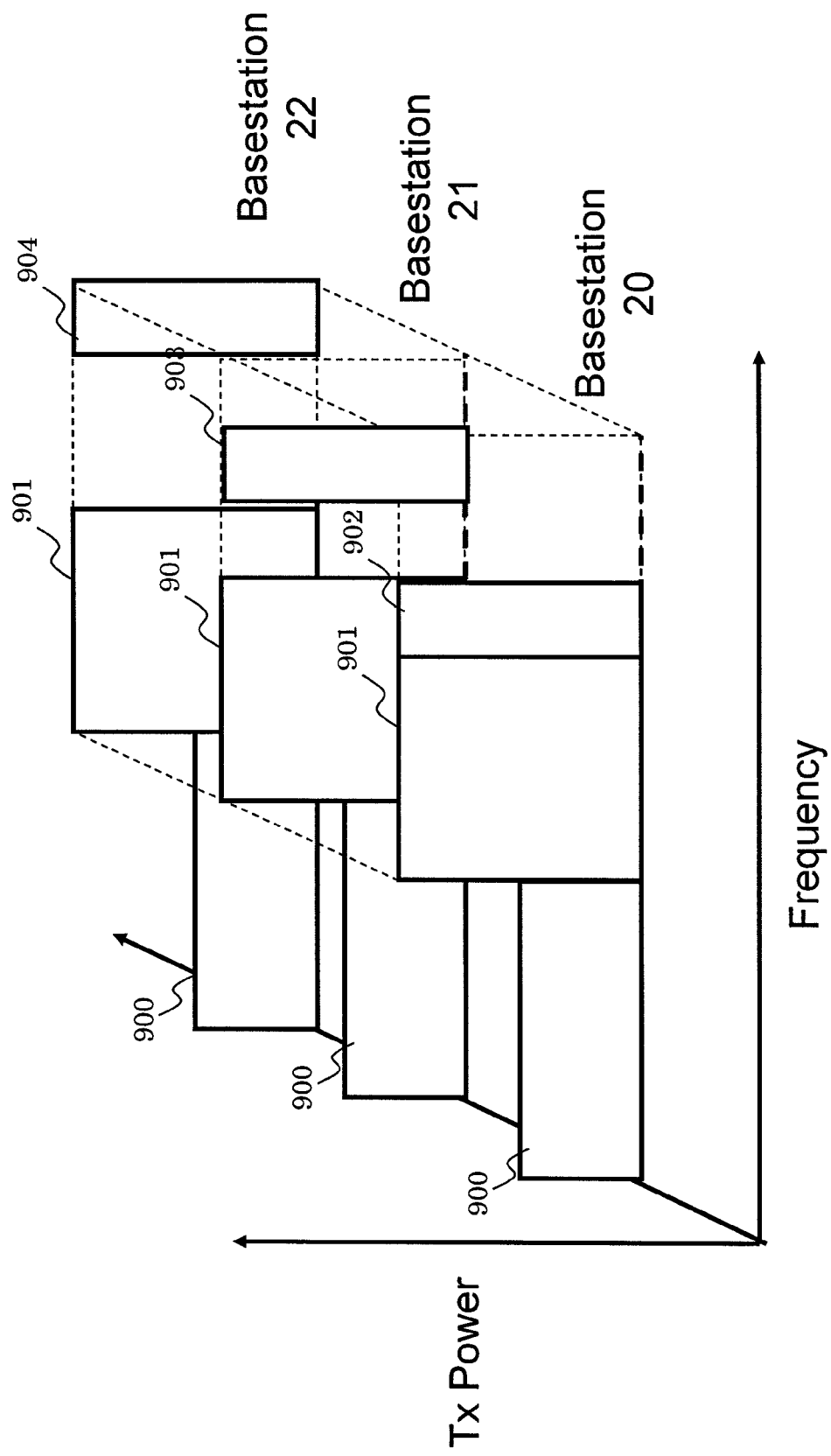
FIG. 6 is a view showing a power profile example when performing the FFR according to an embodiment.

FIG. 6 is an explanatory view showing a frequency configuration example when performing the FFR according to the embodiment of the invention. There are three base stations 20, 21 and 22, in which a horizontal axis represents the frequency. A vertical axis indicates the signal power sent at each frequency. In an example as previously described in the Related art and shown in FIG. 2, the base stations 20, 21 and 22 and the frequencies 61, 62 and 63 correspond in the one-to-one relationship. That is, the base station 20 uses only the frequencies 60 and 61, and does not assign the frequencies 62 and 63.

However, an assignment method that is different from the related art is taken in FIG. 6 explaining the first embodiment of the invention. In the FFR, the frequencies for use at the terminal located outside the cell are largely divided into two kinds of frequency 901 and frequencies (902, 903 and 904). The frequency 901 is the frequency for the beam form that is newly introduced in the invention and/or embodiment. The frequencies (902, 903 and 904) are the frequencies for random assignment prepared for highly random channels with the interference given to the surrounding cells, as for a cell edge of the FFR that is conventionally present.

The sending power per sub-carrier of each of them is greater than a frequency 900 which is used for the terminal in the cell center. Also, for the frequency 901, it is unnecessary to have the same sending power as for the frequencies (902, 903 and 904), because the antenna gain with the array antenna can be obtained as described above, whereby it is required that the sending power is in the range from the power at the frequency 900 to the power at the frequencies (902, 903 and 904).

Figure 2:
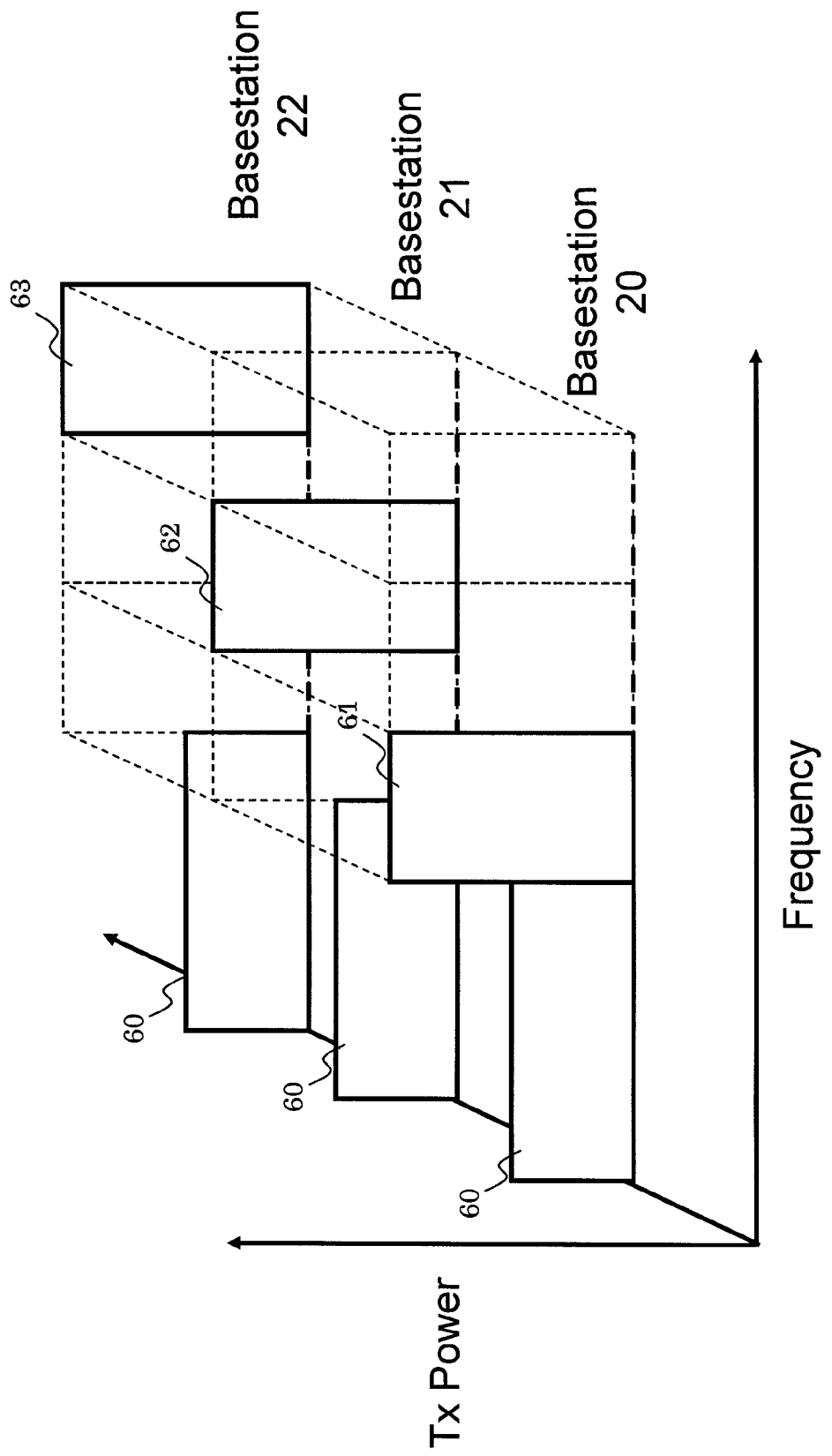
FIG. 2 is an explanatory view showing a power profile example when performing an FFR for controlling the interference between cells.
Figure 3:
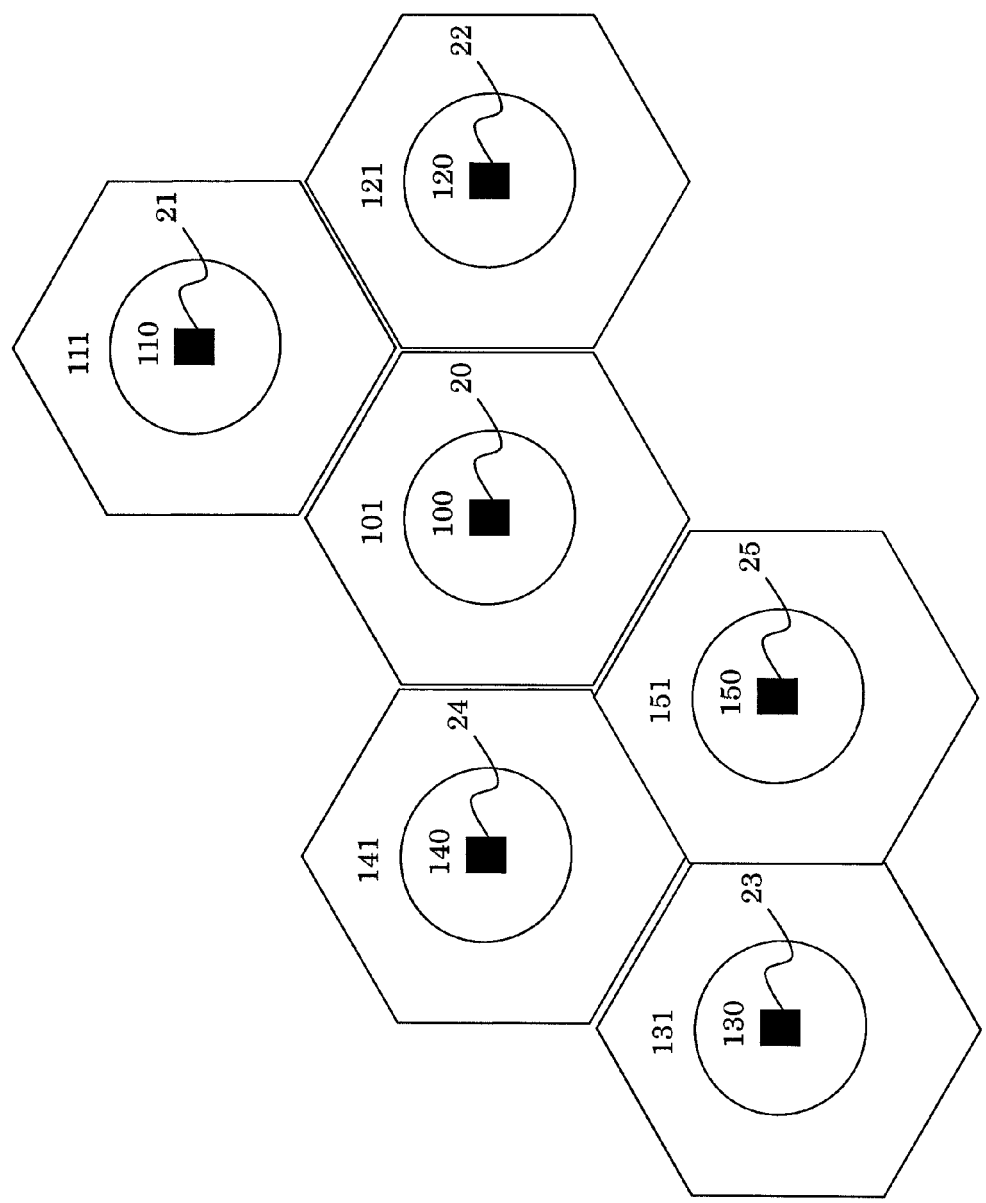
FIG. 3 is a view representing a regional use of frequency when performing an FFR.
Figure 4:
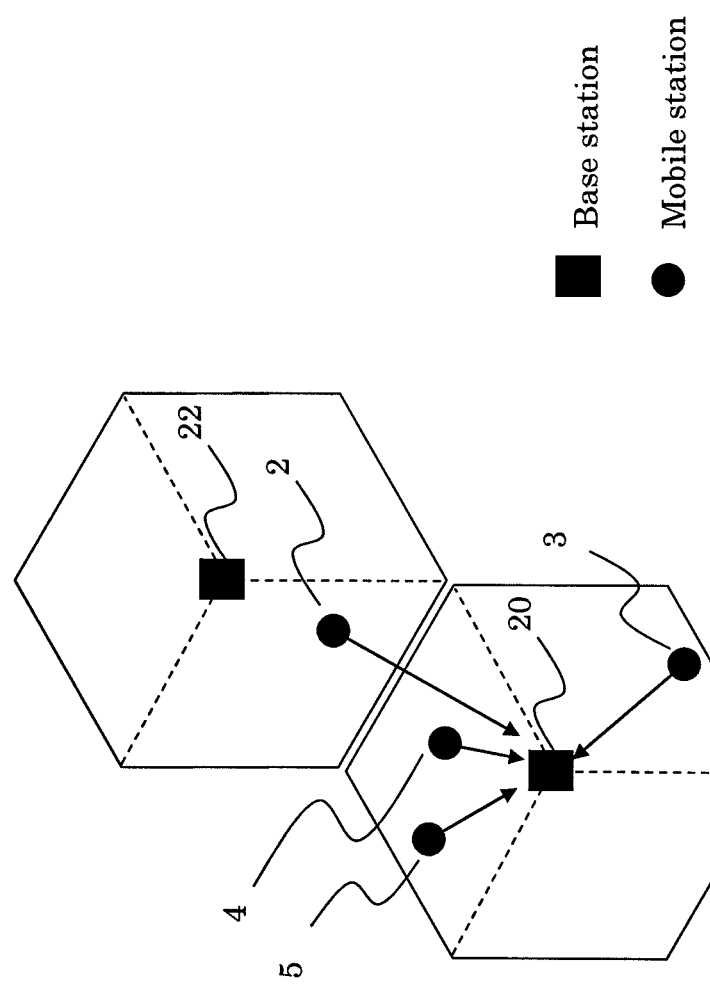
FIG. 4 is a view for explaining the interference when performing an OFDMA.

Firstly, the frequency 900 will be described below. The frequency 900 is used for the terminals (distributed near the base station) located in the cell center, and is the same as the frequency 60 as shown in FIG. 2 and its description part. That is, in the three base stations, the frequency band 900 is sent by a weak sending power from all the base stations. Since an object of use is the terminal located in the cell center, a propagation loss of signal sent from a desired base station is small and the signal with high power is received, even if the sending power is weak. Also, the interference caused by the adjacent base station follows a longer propagation distance than a desired wave, and has a greater propagation loss than the desired wave, with its influence less significant. Therefore, the excellent signal quality is easily obtained.

Next, the frequency 901 will be described below. The frequency 901, which is in an area for channel assignment using the beam form for the terminal at the cell edge, is called a Cell Edge Beam Form (CE-BF). In the CE-BF, the signals are transmitted to two users, using eight antennas, for example. The signal to each user is generated by multiplying the array weight for the eight antennas. For the signal to each user, owing to the array gain with the array weight, the signal transmission with higher signal quality is enabled than the ordinary transmission from one antenna. In addition, the direction where no signal is transmitted is produced as shown in FIG. 5, and if the direction of transmission from the terminal connected to the adjacent base station corresponds to the above direction where the signal is not transmitted, the relevant signal transmission has no interference. By maintaining a situation of having no interference in this specific bearings, that is, not changing the array weight allocated to a specific resource if possible, assignment of the MCS with predicted interference is enabled in the adjacent base station.

Therefore, in the CE-BF, it is effective to assign the relevant resource to the same terminal for a relatively long time.

One method includes providing the resource with a channel frame divided by the time and frequency, constructing the channel frame having a periodic structure, particularly for the time, and assigning a specific terminal to the channel frame, for example. Thereby, in the relevant channel frame, the transmission directed to the specific terminal is continuously performed, whereby the interference is easily predicted. In the related art, as a resource assignment method with the channel frame, a Semi Persistent Scheduling (SPS) and the like are well known. In the invention and/or embodiment, scheduling of the CE-BF is made, using the same method. Particularly if the mobility, or the moving speed, of the relevant user is slow, the array weight is scarcely changed by updating. Further, since the resource assigned by the SPS is almost fixed, it is easy for the terminal connected to the adjacent base station to predict the interference from the relevant resource.

In another embodiment, a method for providing the resource with the channel frame of the time and frequency, constructing the frame having a periodic structure, particularly for the time, and not assigning the terminal to the channel frame over the long term, but assigning the array weight to the relevant channel frame is also effective.

In a latest radio method, the limited number of array weights, which are already known between the base station and the terminal, are defined, and a specific array weight for use is selected from among them, in which this method called pre-coding is mainstream. In the pre-coding method, since the array weight is decided by selecting it from among the predetermined array weights, it may be also possible to pre-assign the array weight, not the terminal, to the specific channel frame, and assign the relevant channel frame to the terminal feeding back the array weight. Consequently, the array weight of the relevant resource is fixed over the long term, and the power prediction under the interference is enabled in the adjacent cell.

Next, the frequencies (902, 903 and 904) will be described below. The frequencies (902, 903 and 904) are in a domain divided into the uses for the space multiplex transmission or diversity transmission for the terminals at the cell edge, and are called a Cell Edge Spatial multiplexing (CE-SM). In the CE-SM, the signal is transmitted to the two terminals, using eight antennas, for example. For the eight antennas, the signal sent from each antenna is not correlative with each other. For example, the four antennas are used for the space multiplex transmission to a terminal A, in which four times the information quantity of one antenna is subjected to the MIMO transmission. Also, the remaining four antennas are used for a Space Time Block Code (STBC) transmission, for example, to a terminal B, transmitting the signals with higher reliability and stability than one antenna. For the transmission to any terminal, the signal sent from each antenna is not correlative with each other. Therefore, the directivity due to array transmission is not produced. Accordingly, the interference given to the terminal connected to the adjacent base station does not have influence on the directivity.

In summary, in the CE-BF, the channel frame is constructed by the frequency and time period, and the specific channel frame avoids the interference with the adjacent base station owing to the beam forming. In the CE-BF band, a specific first channel frame is provided in a certain base station A, and the terminal or array weight is controlled to be fixed in that channel frame, whereby owing to the effect of beam forming, the communication is enabled without giving the interference in the specific direction in that channel frame. The relevant channel frame lying in the bearings not giving the interference is assigned, and a terminal C connected to another base station B can stably keep a state where the interference from the base station A is low, whereby the challenging data transmission with the MCS can be attempted using that condition. On the one hand, in a different second channel frame, the base station A sends the signal to the different terminal from the above terminal. Therefore, using an array weight different from the array weight used in the first channel frame, the communication is made. Therefore, seeing from the terminal C connected to the base station B, great interference may be suffered from the base station A in the concerned second channel frame. In this way, the quality of the propagation path is greatly different for each channel frame, and if the interference condition is controlled to be stable over the long term, it is possible to construct a mechanism for avoiding the interference occurring between the adjacent base stations.

On the other hand, in the CE-SM, interference avoidance is tried by the frequency division, not the beam forming.

There is no difference in the interference between the channel frames, but the situation of interference is changed simply by fading. Also, in the CE-SM, because the interference avoidance between the adjacent base stations is not simple, a step of deciding the frequency used by the serving base station by adjustment with the adjacent base station is needed. Of course, it does not matter if the frequency assignment for a predetermined fixed frequency is employed. In either case, it is required to adjust the frequency assignment for the frequencies (902, 903 and 904) between the base stations, using a long control time such as a few seconds, or the condition such as the traffic volume embraced by each base station, for example.

In the CE-BF, each terminal notifies the interference information regarding each channel frame, or the information on the channel frame with small interference to the base station at the other communication end, whereby the assignment with the optimized control for the interference between the adjacent base stations can be made more positively. On the one hand, the CE-BF can obtain the array gain because the beam form is made using eight antennas, for example. Thereby, the terminal can improve the reception SINR, but because the independent information cannot be sent from the eight antennas, unlike the CE-SM, the effect of increased peak rate owing to the space multiplex can not be obtained. Hence, in the embodiment of the invention, the frequency is clearly distinguished between the CE-BF and the CE-SM.

By distinguishing the frequency between the CE-BF and the CE-SM, the information that the terminal reports as a situation of a propagation path can be also clearly distinguished.

The terminal assigned to the CE-BF mode can automatically select the channel frame with the least interference by predicting the SINR, including the interference with the adjacent base station, and reporting the CQI regarding the SINR at the resolution of each channel frame, and make the signal transmission using the channel frame with less interference possible.

The terminal assigned to the CE-SM mode does not need the resolution of each channel frame, and is sufficient to report channel characteristics of wide band. In a conventional system not distinguishing between the CE-BF and the CE-SM, the effect of avoiding the interference in terms of the array gain, as proposed by the invention and/or embodiment, could not be obtained due to the interference from the terminal making the SM transmission. The possibility of interference avoidance occurs at the frequency of the CE-BF by division into the CE-BF and the CE-SM as in the invention and/or embodiment.

Figure 17:
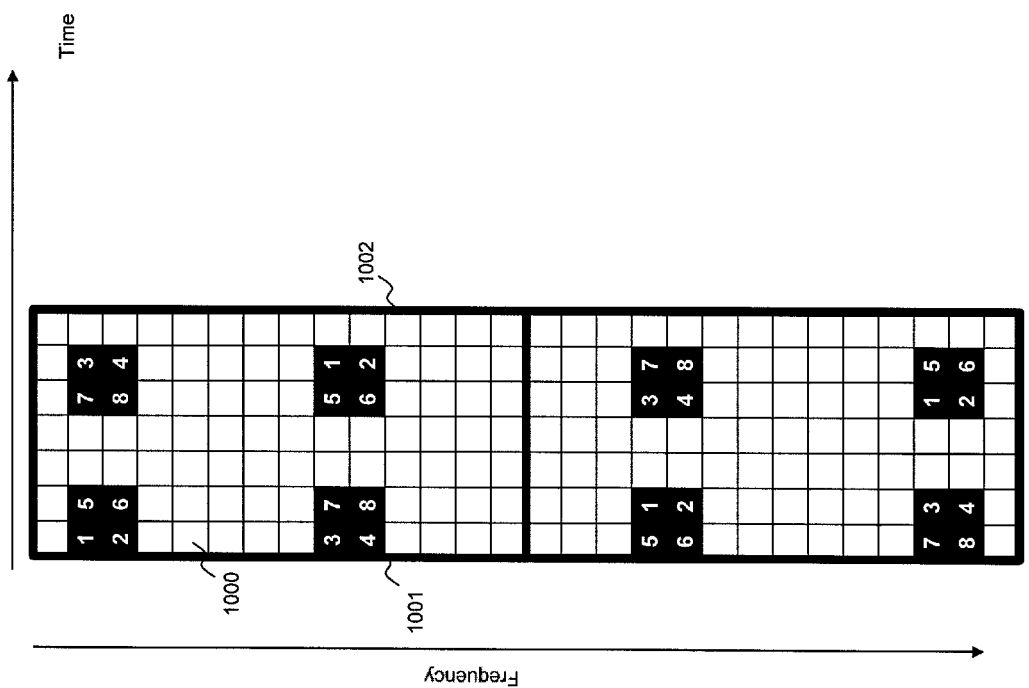
FIG. 17 is a configuration view of a resource block in IEEE802.16m.

FIG. 17 shows a frame configuration of IEEE802.16m. In FIG. 17, the vertical direction on the paper represents the frequency and the lateral direction represents the time. One mesh box (1000) is a unit called a resource element. A length of the resource element along the time axis is decided by the OFDM symbol length. Also, a length of the resource element along the frequency axis is decided by the number of points for a Fast Fourier Transform (FFT) in making the OFDM symbol and the system band. In this figure, a cluster (1002) is composed of fourteen resource elements along the frequency axis and seven resource elements along the time axis. A sub-channel is composed of two clusters. A resource element (1001) with hatch can be seen within each resource block, which indicates the resource element in which the reference signal is arranged. The reference signal is numbered, but this means that the eight antennas send the reference signal at the respective definite positions, and no reference signal is sent to the relevant resource element from the other antennas. The terminal receives this reference signal to estimate the propagation path or noise power.

2. Operation of FFR

Transition Between CE and CC 2-1 Transition Between CC and CC-SM

Figure 7:
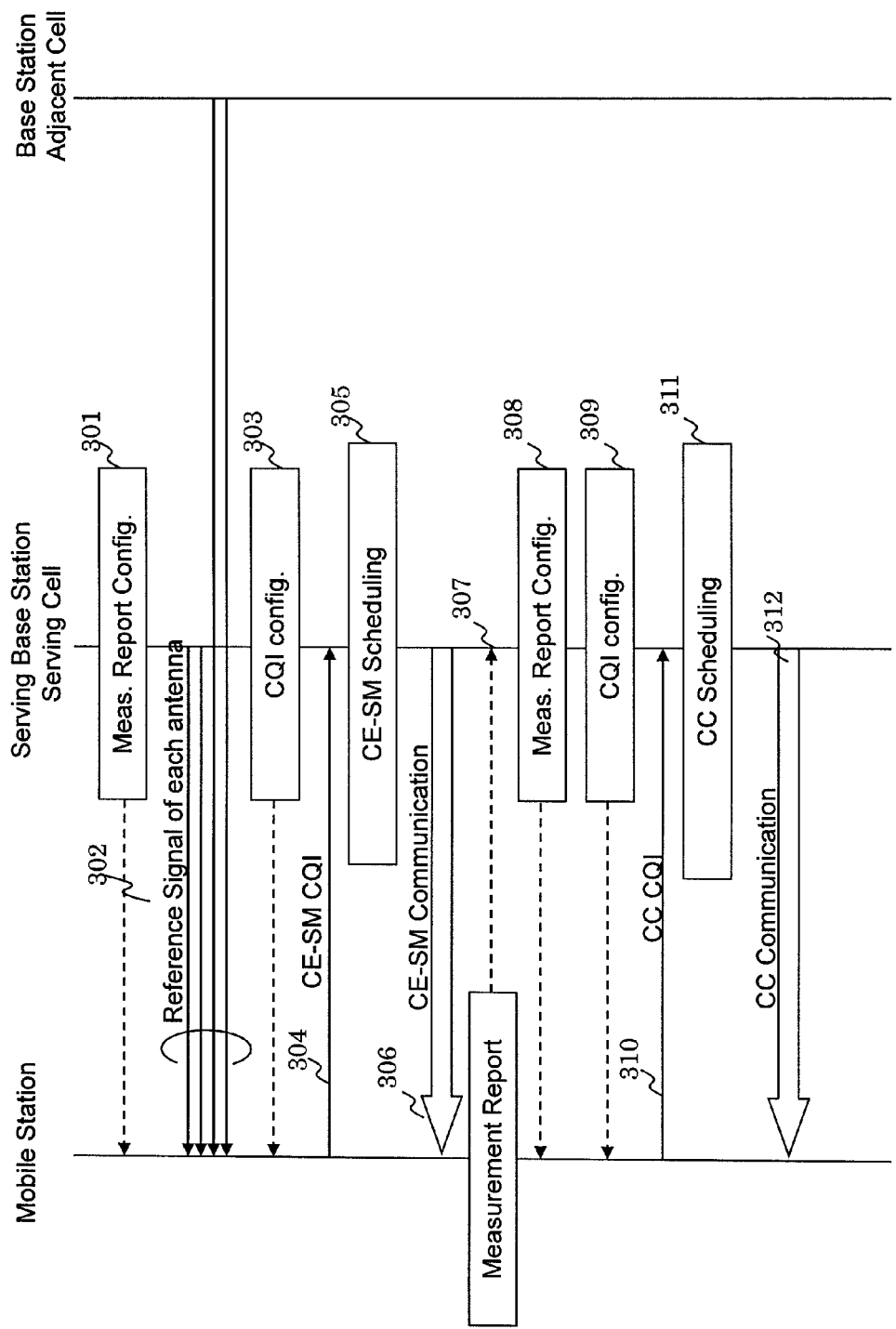
FIG. 7 is a view showing a sequence (1) of CE/CC mode transition according to the embodiment of the invention.

FIG. 7 is a sequence chart of the switching operation between Cell Edge (CE) and Cell Center (CC) in the FFR according to the embodiment of the invention. In the figure, the vertical direction indicates a time flow, in which the time flows from up to down in the drawing. In the figure, the nodes include the terminal (Mobile Station), the serving base station (Serving Cell) and the adjacent base station (Adjacent Cell).

The base station makes two settings for the terminal. The first is a setting of a measurement to lay a trap for determining a switching between a CE mode and a CC mode. The second is the setting of the CQI that the terminal reports.

The first "setting of the measurement for determining the switching between the CE mode and the CC mode" will be described below.

The base station lays a trap in the connecting terminal as being firstly placed in the CE mode (301). The setting of the trap is made by Measurement Report Config. The trap is set such that an average receive signal strength PS of the reference signal sent by the base station being connected over the entire system band is compared with an average receive strength PA of the adjacent base station having a maximum value among the average receive strengths of the reference signals sent by the adjacent base stations over the entire system band, and if the difference is greater than or equal to a threshold T1, namely, PS−PA≥T1, the trap is activated. If the trap is activated, the terminal reports to the base station that the event occurs. In a report, a Measurement Report is employed. The base station receiving the report decides the transition from the CE zone to the CC mode. Conversely, for the terminal being in a state once transiting to the CC mode, another trap is laid, making it possible to return to the CE mode. For example, as the trap for return, if PS−PA<T2, with a threshold T2, the terminal reports to the base station.

The second "setting of the CQI reported by the terminal" will be described below. In the CE mode or CC mode, the kinds of "CQI", "Preferred Matrix Indicator: PMI" and "Rank Indicator: RI" as report items are unchanged, but the frequency of object is different. The terminal in the CE mode is basically sufficient with the report limited to the CE mode. Only when a use of the CC mode is predicted, the report regarding the CC mode may be made. Also, the terminal in the CC mode is basically sufficient with the report limited to the CC mode. Only when the use of the CE mode is predicted, the report regarding the CE mode may be made. Accordingly, the CQI reported by the terminal may be successively set along with the change of the mode.

Turning back to FIG. 7, the description is continued. A report content of measurement result, a format, a trigger and the like are set to the terminal with the Measurement Report Config from the Serving Cell (301). This instruction includes the information regarding a threshold for determining the received signal quality of the reference signal sent by each cell and measured by the terminal. The terminal reports to the base station that if the received signal quality of the reference signal from each sector or cell is under or above the set threshold, and a trigger is laid. The base station instructs the terminal to change various modes in accordance with the report.

In the embodiment of the invention as shown in FIG. 7, each base station makes the communication, using a plurality of antennas. Therefore, the base station sends the individual reference signal from each antenna, using the plurality of antennas (302). The terminal receives the reference signal, and determines whether or not the condition of the threshold as indicated in the Measurement Report Config is satisfied. The base station instructs the mode of the CQI to the relevant terminal to make the communication (303). In the embodiment of the invention, the CQI to be reported is changed depending on the mode. Therefore, in the embodiment of the invention, a report mode of the CQI is also changed with a CQI config from the base station.

In this case, the base station can be preset to instruct the CQI in either a CE-SM mode or a CE-BF mode. Herein, it is assumed that the base station instructs the CQI in the CE-SM mode. In accordance with this instruction, the terminal reports the CQI in the CE-SM mode (304). The base station makes the scheduling of the CE-SM mode using the result (305). The communication using the frequency in the CE-SM mode is made based on the result of scheduling (306). Herein, if the terminal judges that the reception situation of the reference signal satisfies the condition set at step 301, the Measurement Report corresponding to it is reported from the terminal to the base station (307). Herein, it is assumed that there occurs an event that the difference between the reception level PA of the reference signal that the terminal receives from the adjacent base station and the reception level PS of the reference signal from the connected base station is greater than or equal to the threshold T1. That is, PS−PA≧T1. The base station recognizes that the terminal comes closer to the cell center by receiving the Measurement Report and decides the transition from the CE mode to the CC mode. And, firstly, the Measurement Report config is reset by the base station (308). With this reset, the base station sets a trigger to make the report from the terminal to the base station to prepare for the case where the terminal transits to the CE mode again. The CQI config is sent from the base station to the terminal to change the CQI mode to the CC mode (309). And in response, the CQI report of the terminal is changed to the CQI of the CC mode (310). A packet scheduler of the base station makes the scheduling of the CC mode, using the result (311), and the communication using the frequency of CC is made (312).

2-2 Transition Between CC and CE-BF

Figure 18:
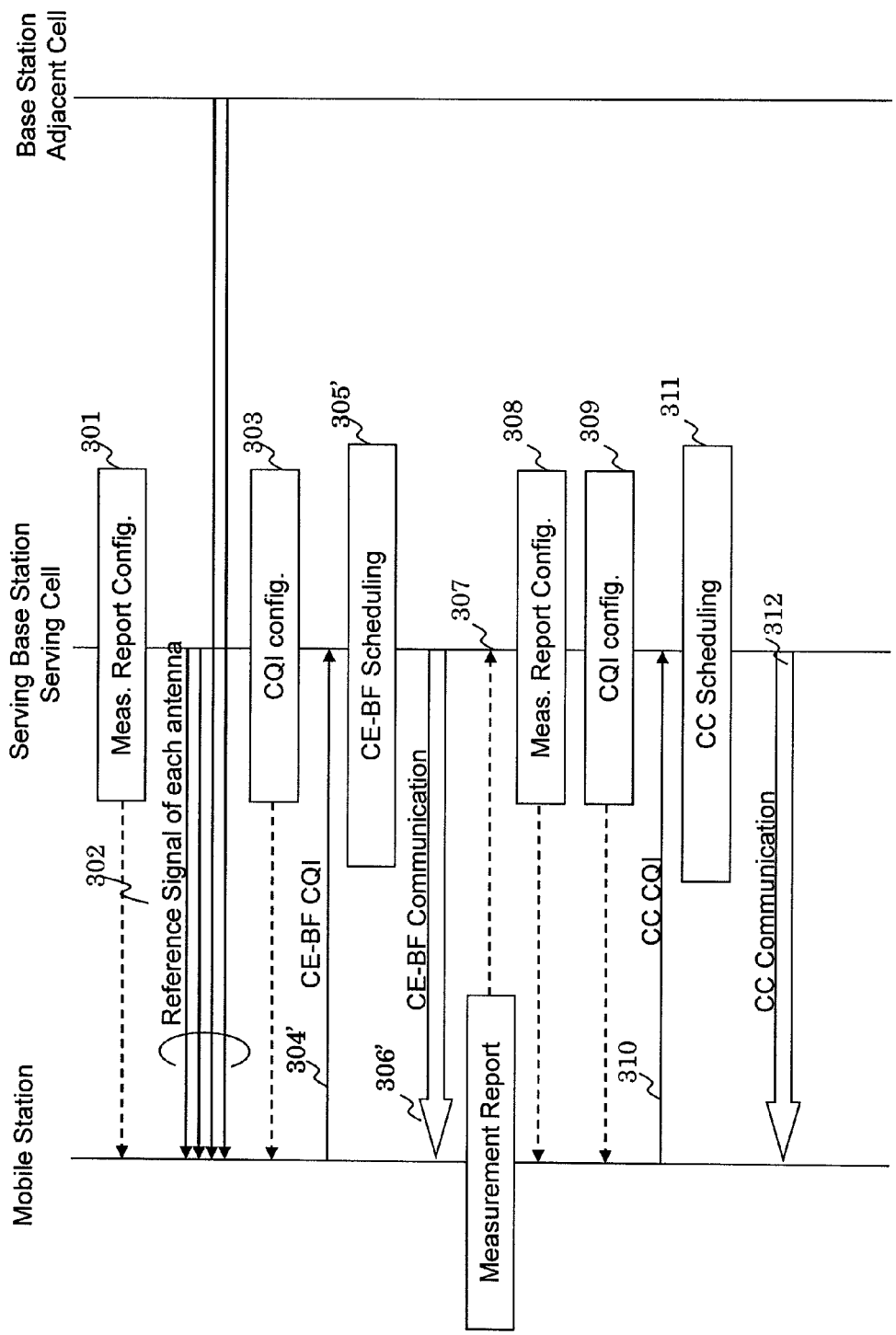
FIG. 18 is a view showing a sequence (2) of the CE/CC mode transition according to the embodiment of the invention.
Figure 19:
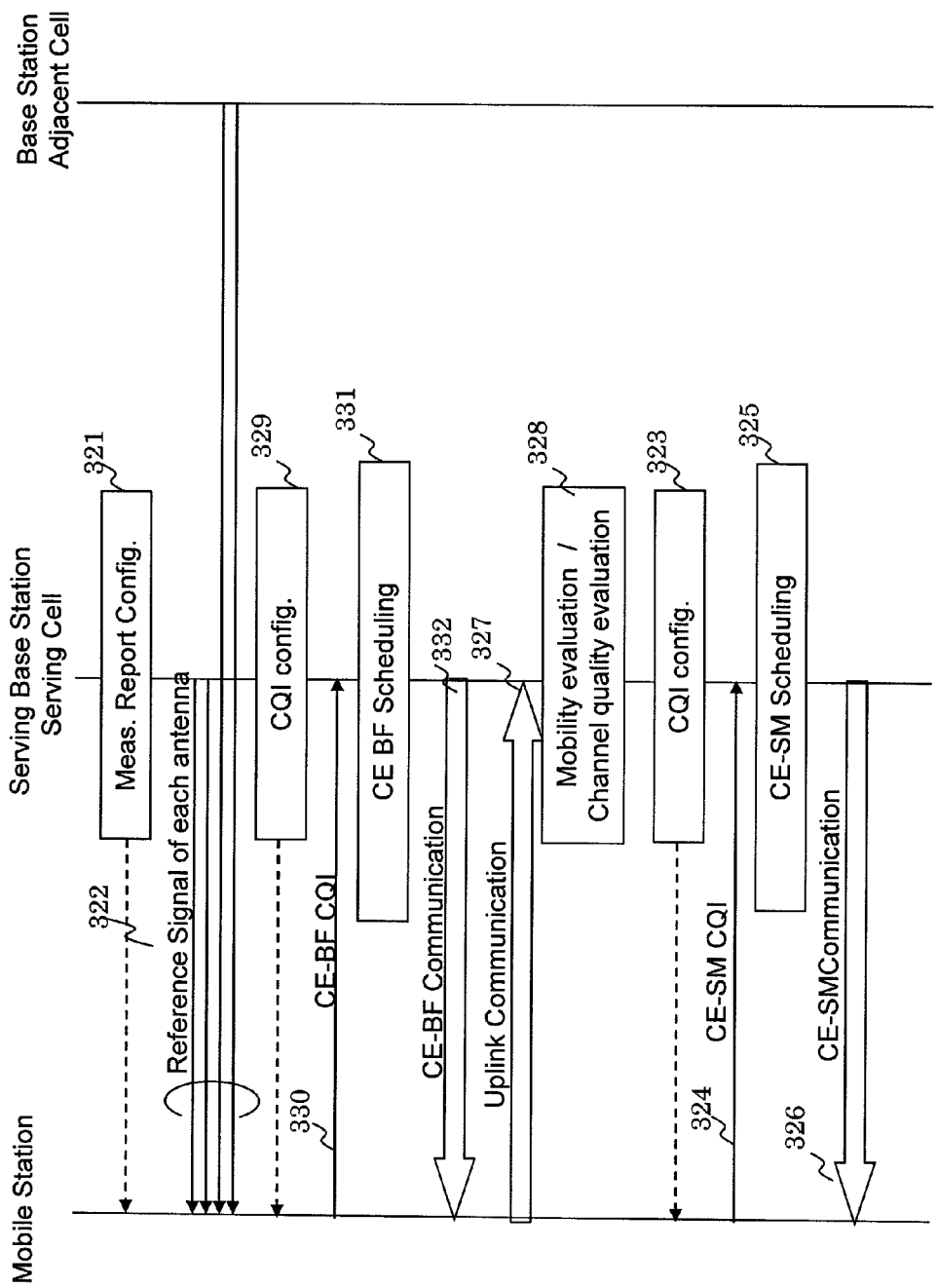
FIG. 19 is a view showing a sequence (2) of the CQI mode transition according to the embodiment of the invention.

FIG. 18 is a view showing the sequence of the CE/CC mode transition according to the embodiment of the invention. This figure shows a process in which the base station is preset to instruct the CQI in the CE-BF mode. The processing at each of steps 301 to 303 is the same as described above in connection with FIG. 7. However, at step 303, it is assumed that the base station instructs the CQI in the CE-BF mode. The terminal reports the CQI in the CE-BF mode at step 304', the base station makes the scheduling of the CE-BF mode at step 305', and the communication is made using the frequency in the CE-BF mode at step 306'. The processing at each of steps 307 to 312 is the same as described above in connection with FIG. 7.

3. Operation of FFR

Transition Between CE-BF and CE-SM 3-1. Transition from CE-SM to CE-BF

Figure 9:
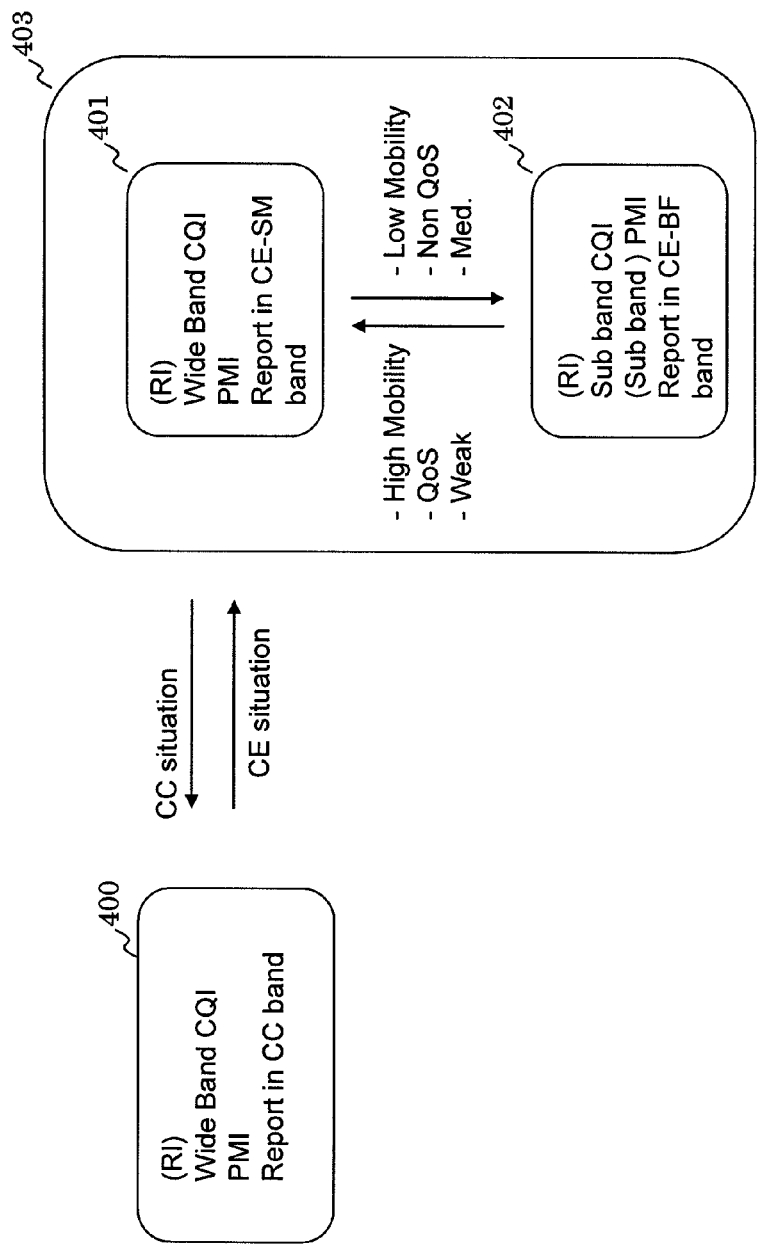
FIG. 9 is a view showing the CQI mode transition according to the embodiment of the invention.

FIG. 9 is a view showing the mode transition of the CQI between the CC mode (400), the CE-SM mode (401) and the CE-BF mode (402). If the condition of the CC mode is satisfied, the terminal in the CE mode (403) reports to the base station that the condition is satisfied, makes the mode transition in accordance with an instruction of the base station, and is put in the CC mode (400). Conversely, if the condition of the CE mode is satisfied, the terminal in the CC mode (400) reports to the base station that the condition is satisfied, makes the mode transition in accordance with an instruction of the base station, and is put in the CE mode (403).

The transition between the CE-SM and the CE-BF that is a feature of the invention is explained in FIG. 9. The mode transition is determined in the CE mode by the state of the relevant terminal, for example, mobility, QoS or received signal quality.

Though the parentheses are used in FIG. 9, the meaning will be described below. It is indicated that the information without parentheses is the information reported at the frequency of sub-frame. For example, if the sub-frame length is 1 ms, the report is made at every 1 ms. The information with the parentheses ( ) is reported at the frequency of once per plural sub-frames. For example, the information is reported at every 100 ms.

Figure 8:
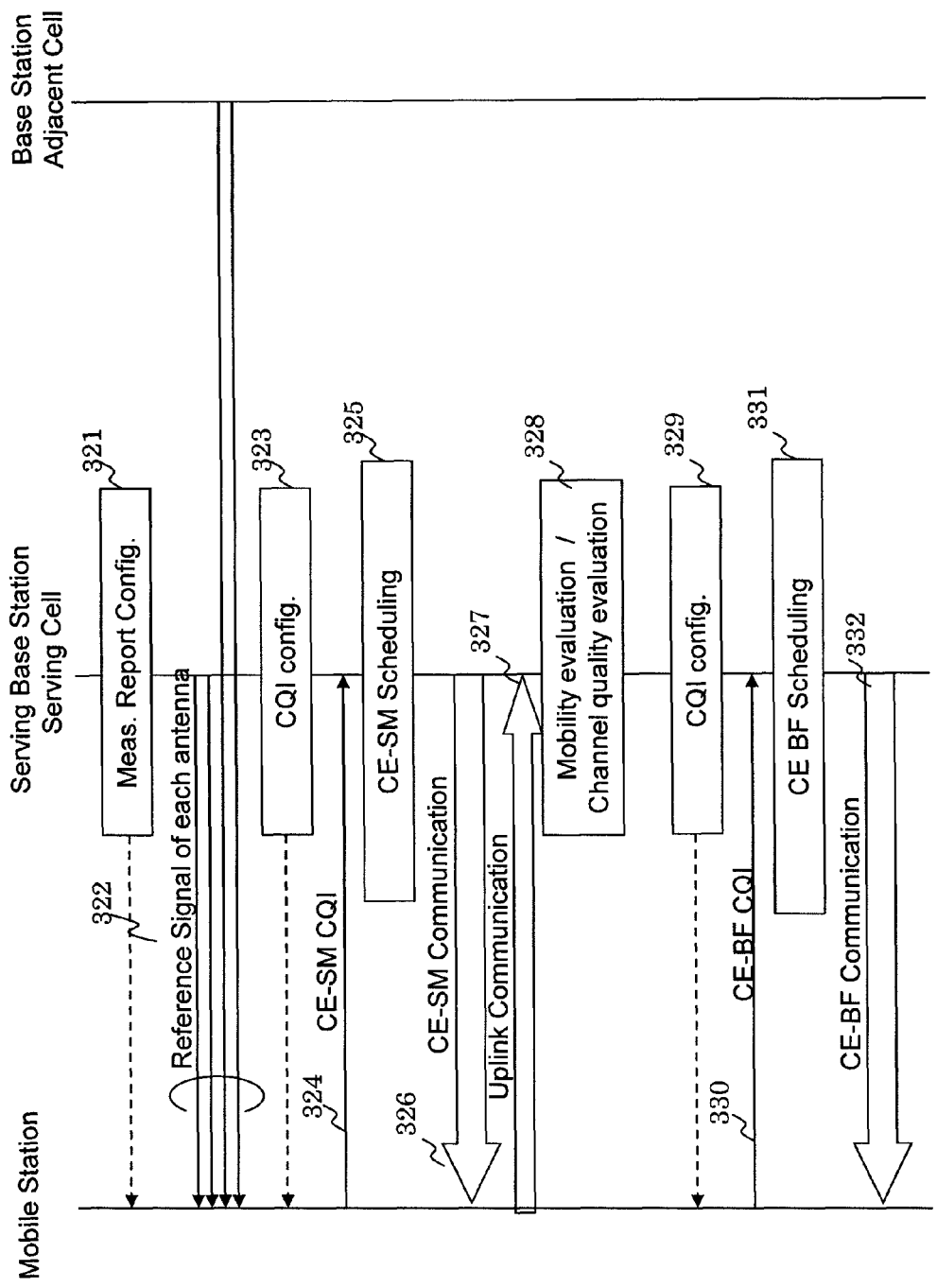
FIG. 8 is a view showing a sequence (1) of CQI mode transition according to the embodiment of the invention.

FIG. 8 is a view showing the sequence of the CQI mode transition according to the embodiment of the invention. The transition between the CE-SM and the CE-BF will be described below, using FIG. 8. The base station lays a trap to the connecting terminal as firstly arranged in the CE mode (321). This trap is used to detect the transition to CC in the same way as described above at step 301. Each base station makes the communication, using a plurality of antennas. Therefore, each base station sends the individual reference signal from each antenna, using the plurality of antennas (322). The terminal receives the reference signal, and determines whether or not the condition of the threshold as indicated in the Measurement Report config is satisfied. The base station instructs the mode of the CQI to the relevant terminal to make the communication (323). In this case, the base station can be preset to instruct the CQI in either the CE-SM mode or the CE-BF mode. In this embodiment, it is assumed that the base station instructs the CQI in the CE-SM mode. In accordance with this instruction, the terminal reports the CQI in the CE-SM mode (324). The base station makes the scheduling of the CE-SM mode using the result (325). The communication using the frequency in the CE-SM mode is made based on the result of scheduling (326).

Herein, an upstream communication that is paired with a downstream communication is considered. For example, a system in a TDD mode is defined in the IEEE802.16m or LTE-Advanced. In the TDD mode, a downstream line in which the signal is sent from the base station and received at the terminal and an upstream line in which the signal is sent from the terminal and received by the base station use the same frequency band, in which the upstream line and the downstream line are distinguished according to a time schedule. In such a radio system, the propagation path situation of the downstream line is easily grasped using the upstream line.

Particularly, it is easy to decide the array weight of the antenna. Therefore, the quality of the propagation path corresponding to the downstream line is checked using the upstream line at step 328. In the upstream line, the base station has a propagation path estimation circuit for the receiving operation. Using the result, the detailed quality analysis of the upstream line is possible. Thus, a mobility or a moving speed of the terminal, and the quality of the propagation path are estimated using this mechanism. For example, if the estimated moving speed is slow enough, the beam form is effective. Also, if the quality of the propagation path is inferior, the quality can be improved by making the beam form. With such a judgment, the base station decides the transition of the relevant terminal from the CE-SM to the CE-BF. Specifically, the base station can judge the mode for transition by comparing the mobility or moving speed, the quality of the propagation path or its change, or a combination of these items, with a mode transition condition such as a predetermined threshold, for example. Then, the base station resets the CQI mode based on this decision at step 329. That is, in this example, the base station sets the CQI mode in the CE-BF. In this case, it may be unnecessary to reset the Measurement Report Config. Then, the terminal reports the CQI of the CE-BF, based on the newly set CQI mode at step 330. A packet scheduler of the base station makes the scheduling of the CE-BF mode using this result (331), and the communication using the frequency of CE-BF is made (332).

3-2. Transition from CE-BF to CE-SM

If the transition between the CC mode and the CE-BF mode is set in FIG. 7, and/or the instruction of the CQI in the CE-BF mode is preset, the processing at steps 323 to 326 and the processing at steps 329 to 332 in FIG. 8 are interchanged. FIG. 18 is a view showing the sequence of the CQI mode transition in this case. The processing at each step is the same as described above in connection with FIG. 9.

Also, in the CE mode, the transition between the CE-SM mode and the CE-BF mode is the same as described above in connection with FIGS. 7 and 18.

Further, as a specific example, the number of terminals belonging to a specific mode (e.g., CE-BF) increases to have a difference in resource allocation from the number of terminals in the other modes, and if the transmission efficiency in the specific mode decreases, the load balance is executed. For example, the terminal to be originally assigned to the CE-BF may be assigned to the CE-SM in some cases, but in such cases, if the basic operation follows the frequency division proposed by the invention and/or embodiment, it is apparent that this operation is included in the category of the invention. In this case, the base station can control the transition between the modes, using an index or threshold for the transmission efficiency or load balance as the mode transition condition.

4. Software Operation of Base Station and Terminal

Figure 10:
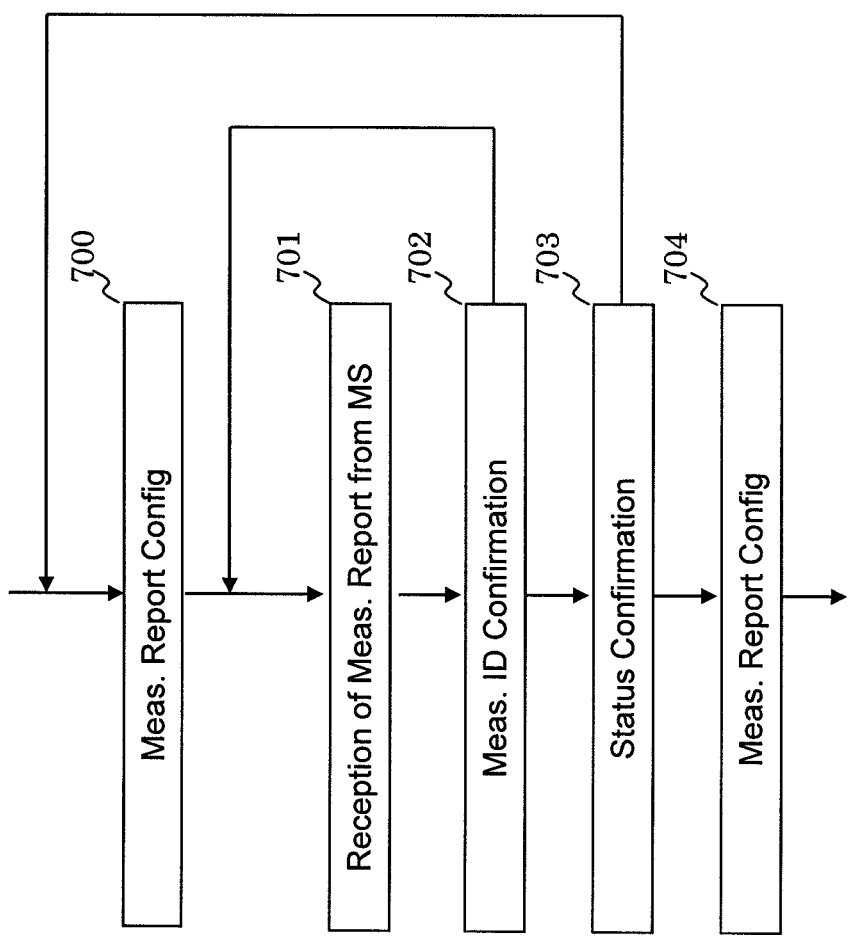
FIG. 10 is a flowchart showing an operation flow of a base station according to the embodiment of the invention.

FIG. 10 shows an operation flowchart of the base station regarding the transition between the CE mode and the CC mode.

First of all, the base station sets the Measurement Report Config to the relevant terminal at step 700. Since a plurality of Measurement Report Configs can be set to the terminal, the base station sends an identifier, Measurement ID, for identifying the set Measurement Report Config at the same time.

At step 701, the base station waits for the Measurement Report to be reported from the terminal. If the base station receives the Measurement Report from the terminal, the operation goes to the next step 702.

At step 702, the base station confirms the Measurement ID of the Measurement Report. If the Measurement ID is not expected by this software, the operation returns to step 701, where the base station waits for the next Measurement Report. Also, if the Measurement ID is matched, the base station proceeds to the next step 703.

At the next step 703, the base station confirms a Status. It is determined whether or not the Status of the terminal informed to the base station with the Measurement Report is matched with the CE/CC mode transition condition. Herein, the Status and mode transition condition is PS−PA>T1, PS−PA<T2, and so forth, for example, as described above. If matched, the operation proceeds to the next step 704. If unmatched, the operation returns to step 700 to reset the Measurement Report config.

At the next step 704, the base station instructs the relevant terminal on the transition to the CE/CC mode and a trigger of new transition. Specifically, the base station sends a command of setting the Measurement Report Config as the trigger for transition to the terminal to return to the original mode again.

Figure 12:
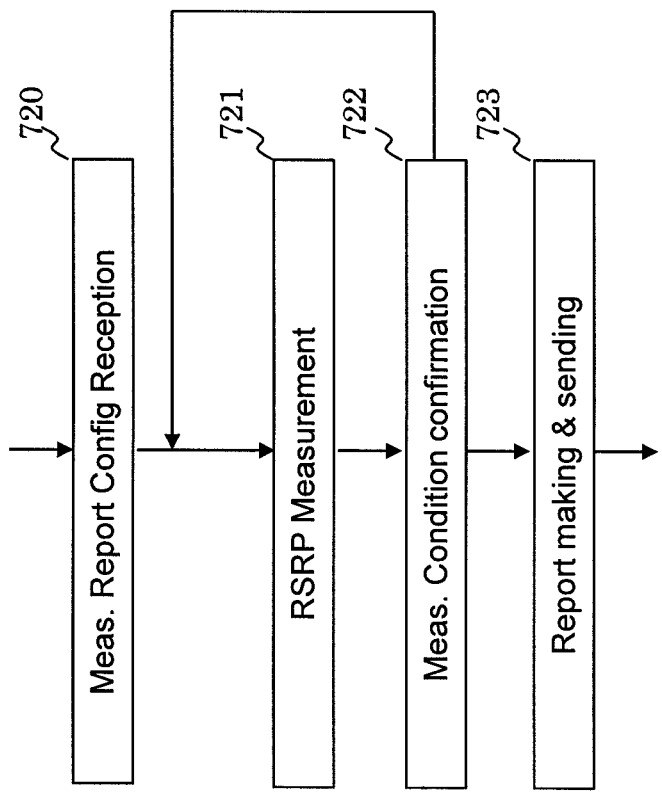
FIG. 12 is a flowchart showing the operation flow of a terminal unit according to the embodiment of the invention.

FIG. 12 shows an operation flowchart of the terminal regarding the CC/CE mode transition. First of all, at step 720, the terminal receives the Measurement Report Config from the base station. Then, transferring to step 721, the terminal makes a measurement of the reference signal. In this measurement, the terminal receives the reference signal sent by the connecting base station, or the reference signal sent by the adjacent station, and measures the reception power of the reference signal. If the measurement is completed, the operation goes to step 722. At step 722, the terminal checks whether or not the measurement result conforms to the condition (mode transition condition) set by the base station at step 720. As a result of check, if the condition is not satisfied, the operation returns to step 721 to make the next measurement. This measurement is periodically made, and every time of measurement it is checked whether or not the condition is satisfied. As a result of check, if the condition is satisfied, the operation goes to step 723. At step 723, the terminal creates a Report to be reported to the base station, and sends it to the base station.

Figure 11:
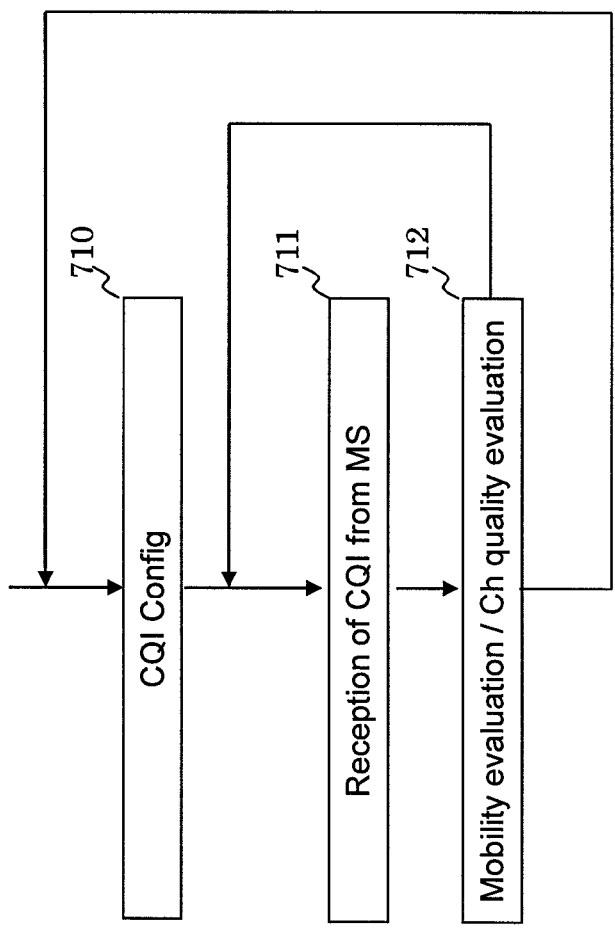
FIG. 11 is a flowchart showing the operation flow of the base station according to the embodiment of the invention.

FIG. 11 shows an operation flow of the base station in the mode transition between the CE-SM and the CE-BF within the CE. First of all, at step 710, the base station sets the CE-SM or CE-BF to the relevant terminal. The setting is made by sending the CQI Config to the terminal. At the next step 711, the base station receives a CQI report sent from the terminal. Then, at step 712, the base station receives a signal in the upstream line sent from the terminal to grasp the situation of the propagation path. By the setting, the base station determines whether or not the transition between the CE-BF and the CE-SM is made by comparison with several thresholds. For judgment of matching with the mode transition condition, the base station can determine the transition to the CE-SM mode if the mobility/moving speed of the terminal is higher than a predetermined threshold, or the transition to the CE-BF mode if it is slower, for example. Also, it is possible to determine the transition to the CE-SM mode if the quality of the propagation path, or its change, is better than a predetermined threshold, or the transition to the CE-BF mode if it is worse. Besides, if any of these conditions, or both, is satisfied, the transition may occur. If the mode is changed by the determination, the operation jumps to step 710, where the CQI Config is reset. If the mode is not changed, the base station returns to step 711 to continue to receive the CQI in the same mode.

In this embodiment, step 712 is always performed once in one loop, but because it is unnecessary that the mode is frequently changed, step 712 may be performed once at every 100 ms, for example.

Figure 13:
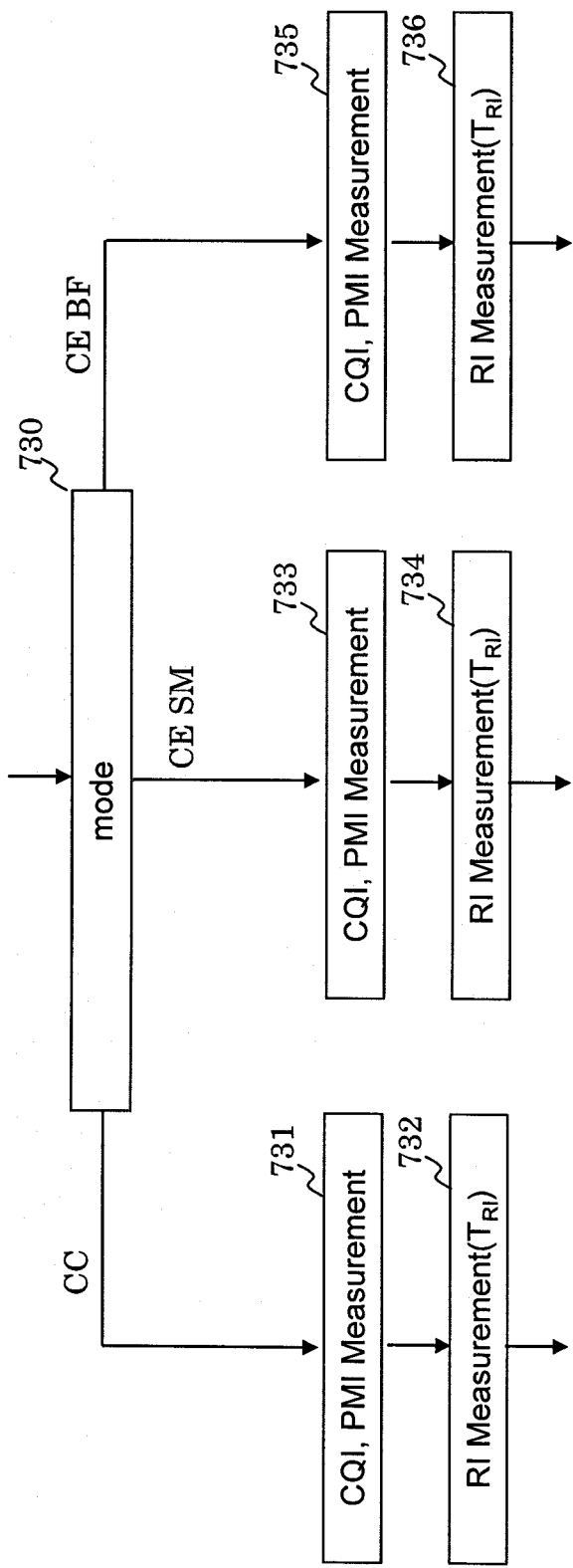
FIG. 13 is a flowchart showing the operation flow of the terminal unit according to the embodiment of the invention.

FIG. 13 is a flowchart representing a mechanism in which the CQI reported by the terminal is changed depending on the mode. The terminal makes a choice in accordance with the mode instructed with the CQI config by the base station. If the CC mode on the left side is selected, the terminal makes a measurement of CQI and PMI (731) and a measurement of RI (732) in the frequency band of CC, and reports them to the base station. If the CE-SM mode is selected, the terminal makes a measurement of CQI and PMI (733) and a measurement of RI (734) in the frequency band of CE-SM, and reports them to the base station. If the CE-BF mode side is selected, the terminal makes a measurement of CQI and PMI (735) and a measurement of RI (736) in the frequency band of CE-BF, and reports them to the base station. In the case of the CE-BF mode, the report is required for every channel frame. In other modes, a so-called wide band CQI is reported, while a narrow band CQI is reported in the CE-BF mode. Also, for the PMI, a narrow band PMI for every specific channel frame is reported in the CE-BF mode.

5. Operation of Base Station Hardware

Figure 14:
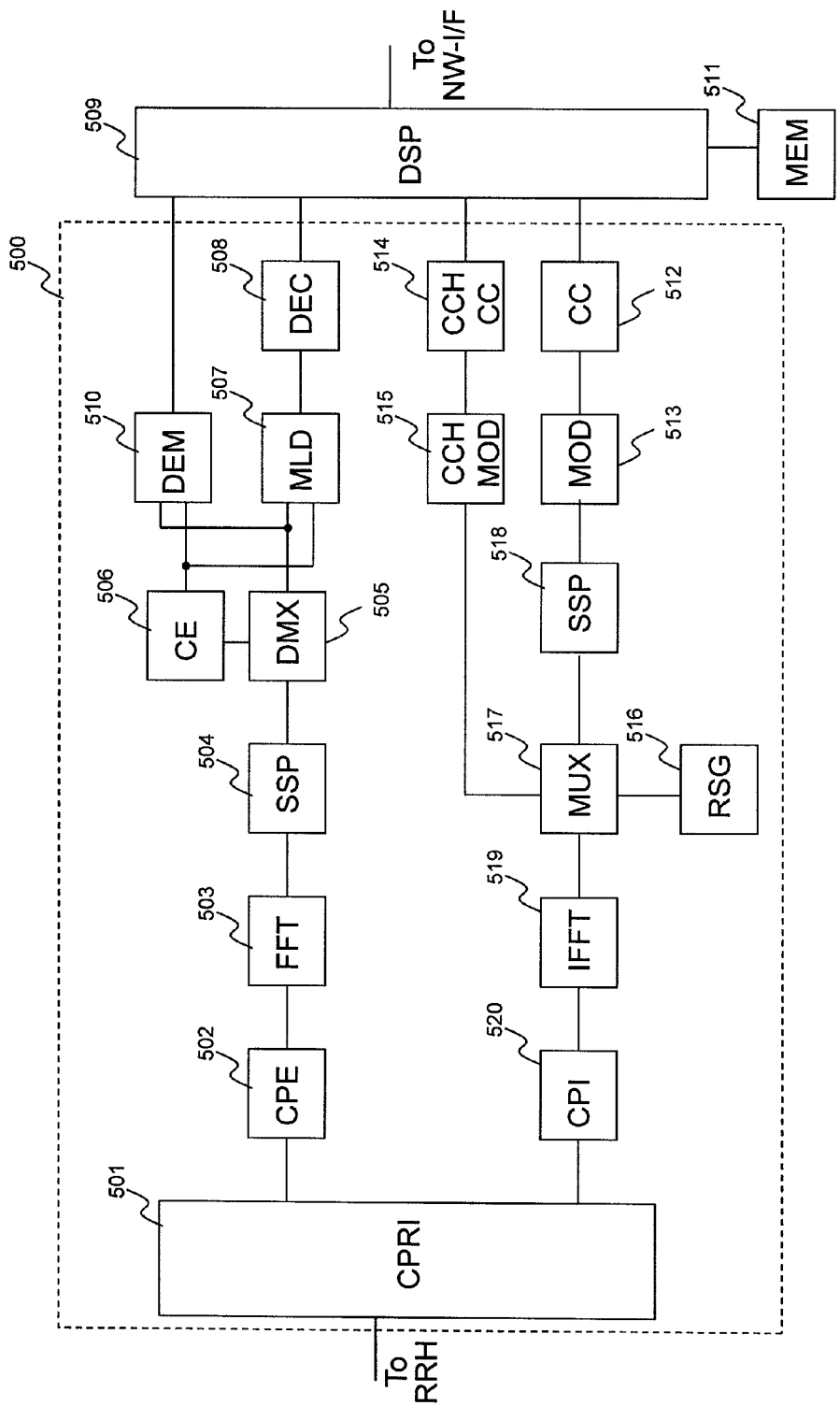
FIG. 14 is a block diagram of the base station (base band section) according to the embodiment of the invention.
Figure 15:
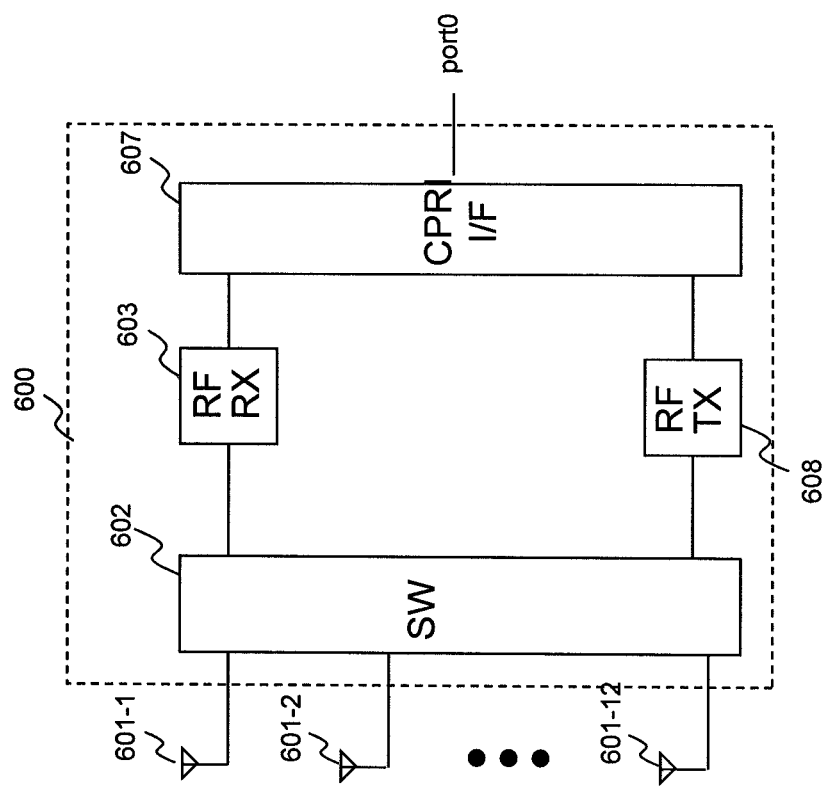
FIG. 15 is a block diagram showing the base station (radio unit) according to the embodiment of the invention.

FIG. 14 is a view showing a configuration example of a base station base-band section according to the embodiment of the invention. FIG. 15 shows Radio Frequency (RF) section (Remote Radio Head: RRH). The base-band section and the RF section are connected through a Common Public Radio Interface (CPRI). In this embodiment, a Time Division Duplex (TDD) is supposed in the explanation.

In FIG. 15, signals received by a plurality of antennas (601) are separated into an upstream signal and a downstream signal by a switch section (602). The upstream signal is sent to a Receiver (RX) section (603). In the RX section (603), signal processing such as signal amplification, frequency conversion and digitization is performed, and the signal is sent to a CPRI interface section (607). In the CPRI interface section (607), the signal is converted into a CPRI format, and sent to a base-band section as indicated by Port0 in the figure.

In FIG. 14, the signal received by the RF section is inputted from the left in the figure, and replaced with the signal of IQ 16 bits for multiple antennas in a CPRI interface section (501). The replaced signal has a Cyclic Prefix (CP) removed for each antenna in a CP Extraction (CPE) section (502). The CP is a redundant signal inserted to improve a delay wave resistance of the OFDM signal. The signal having the CP removed is transformed into the information in the frequency domain in a Fast Fourier Transform (FFT) section (503). The information transformed for the frequency domain is subjected to digital beam form in a Spatial Signal Processing (SSP) section (504), and processed from the information of antenna element into the information of beam element. The information processed into the beam element is decomposed into each channel element separated at a resolution of OFDM symbol and sub-carrier in a Demultiplexing (DMX) section (505). This is called de-mapping. The de-mapped information includes the reference signal. The reference signal is passed to a Channel Estimation (CE) section (506), and used to estimate the propagation path. Also, the CE section can estimate an interference wave from the terminal connected to the adjacent base station, or the like, using the reference signal. The estimated propagation path is used to detect send data. Further, a change in the estimated result of the propagation path along the time axis is detected to estimate the mobility, or moving speed of the mobile station. Or the propagation loss is estimated from the reported value relating to the sending power reported from the terminal. The estimated moving speed or propagation loss is taken into a Digital Signal Processor (DSP), and used for the mode transition in the downstream line. The send data includes user data and control data. The control data is subjected to a detection and decode process in a Demodulation (DEM) section (510), and passed to a DSP section (509). The user data is subjected to an MLD process using the estimated propagation path in a Maximum Likelihood Detection (MLD) section (507). Using a Log Likelihood Ratio (LLR) obtained as a result, a decode process is performed in a Decoding (DEC) section (508), and the obtained decoded result is passed to the DSP section (509). In the DSP section, the channel estimation result obtained from the CE section (506), the decode result of control data and the decode result of user data are collected, and the user data is sent through the network interface to a network. The channel estimation result and the control information are accumulated in a memory (511), and used to control the packet scheduler constructed within the DSP.

In FIG. 14, the downstream signal sent from the network is once accumulated in the memory (511) of the DSP section (509), and sending timing, sending beam, sending resource block and modulation method are decided by the scheduler contained in the DSP section (509), whereby the signal is processed into the send signal in accordance with the decision. Firstly, the user data in the memory (511) is subjected to channel coding in a CC section (512). The signal after channel coding is converted into a modulating signal of QPSK or the like in a Modulation (MOD) section (513). The converted modulating signal is subjected to a spatial signal process in an SSP section (518). For example, the spatial signal process includes a space multiplex, a sending diversity and a beam forming. The output is mapped and arranged in the sub-carrier of the OFDM symbol in a Multiplexing (MUX) section (517). By the mapping, the reference signal generated in a Reference Signal Generator (RSG) section (516) and the control channel information generated via a Control Channel Channel Coding (CCHCC) section (514) or a Control Channel Modulation (CCHMOD) section (515) are also arranged. Herein, the CCHCC section (514) is a block for coding the control information generated by the DSP section (509), and the CCHMOD section (515) is a block for modulating the coded control information. The information in the frequency domain for each antenna element mapped by the MUX section (517) is converted into a signal in the time domain in an IFFT section (519). The obtained signal in the time domain has the CP affixed in a CPI section (520), and is converted into the CPI interface signal in the CPRI interface section (501) and sent to the RF section (RRH).

What is claimed is:

1. A cellular radio communication system comprising a radio base station apparatus for making any one of a space multiplex transmission and a beam form transmission using a plurality of antennas and a plurality of radio terminal units, each radio base station apparatus, (i) separating communicable frequency band in the cellular radio communication system to:
a first frequency band assigned to the radio terminal unit in the cell center, and
a second frequency band assigned to the radio terminal unit on the cell edge;
(ii) further using properly the second frequency band by separating to:

a beam form transmission of sending the same signal with an array weight multiplied to the plurality of radio terminal units from at least two or more antennas, and multiplex transmission of sending a different or independent signal from each of at least two or more antennas to the same radio terminal unit or the plurality of radio terminal units;

wherein each radio base station apparatus specifies the information of frequency bands and transmission method in accordance with a state of each radio terminal unit; and wherein the radio base station apparatus or the radio terminal unit changes a report content of communication quality information from the radio terminal unit, depending on the specified frequency band and the specified transmission method.

2. The cellular radio communication system according to claim 1, wherein the radio base station apparatus judges a change of the frequency band and the transmission method from an upstream propagation path situation, generates a message including a report content of communication quality information in each mode, and notifies it to the radio terminal unit.

3. The cellular radio communication system according to claim 1, wherein the radio base station apparatus generates a message including a designation of communication quality information in a narrow band as a report content of the communication quality information and notifies it to the radio terminal unit, when using the second frequency band.

4. The cellular radio communication system according to claim 1, wherein the radio base station apparatus or the radio terminal unit has a sending power at the frequency band using the beam form transmission in the second frequency band that is greater than or equal to a sending power at the first frequency band and smaller than or equal to a sending power at the frequency band using the space multiplex transmission in the second frequency band.

5. The cellular radio communication system according to claim 1, wherein the radio base station apparatus provides a channel frame divided by a time and a frequency for a resource at the frequency band using the beam form transmission in the second frequency band, and assigns a specific radio terminal unit to the channel frame or assigns an array weight to an antenna array.

6. The cellular radio communication system according to claim 1, wherein the radio base station apparatus sends, in accordance with a cell center mode (CC mode) in which a frequency used by the radio terminal unit is in the first frequency band or a cell edge mode (CE mode) in which a frequency used by the radio terminal unit is in the second frequency band, measurement report settings including a report content of communication quality information for a reference signal sent by each radio base station apparatus and measured by the radio terminal unit and a transition condition for mode switching between the CC mode and the CE mode to the radio terminal unit, the radio terminal unit reports a measurement report indicating a determination result to the radio base station apparatus, if a determination is made that a measurement result of the reference signal satisfies the transition condition as indicated in the measurement report settings, and the radio base station apparatus makes scheduling by transiting between the CC mode and the CE mode in accordance with the measurement report, and makes a communication with the radio terminal unit, using either the first frequency band or the second frequency band, based on the scheduling result.

7. The radio communication system according to claim 1, wherein the cell edge mode (CE mode) in which the frequency used by the radio terminal unit is in the second frequency band includes a cell edge-beam form transmission mode (CE-BF mode) and a cell edge-space multiplex transmission mode (CE-SM mode), and the radio base station apparatus obtains a predetermined one or more of a moving speed or mobility of the radio terminal unit, quality of a propagation path, or its change, transmission efficiency, and load balance, in accordance with a propagation path situation of an upstream line from the radio terminal unit, determines a transition between the CE-BF mode and the CE-SM mode in accordance with the obtained result, makes a scheduling based on the determination, and makes a communication using the CE-BF mode and the CE-SM mode by further separating the second frequency band.

8. A base station apparatus in a cellular radio communication system comprising the radio base station apparatus for making any one of a space multiplex transmission and a beam form transmission using a plurality of antennas and a plurality of radio terminal units, the radio base station apparatus, (i) separating communicable frequency band in the cellular radio communication system to:

a first frequency band assigned to the radio terminal unit in the cell center, and a second frequency band, assigned to the radio terminal unit on the cell edge;

(ii) further using properly the second frequency band by separating to:

a beam form transmission of sending the same signal with an array weight multiplied to the plurality of radio terminal units from at least two or more antennas, and a space multiplex transmission of sending a different or independent signal from each of at least two or more antennas to the same radio terminal unit or the plurality of radio terminal units; and specifying the information of frequency band and transmission method in accordance with a state of each radio terminal unit;

wherein the radio base station apparatus changes a report content of communication quality information from the radio terminal unit, depending on the specified frequency band and the specified transmission method.

9. The base station apparatus according to claim 8, wherein the radio base station apparatus judges a change of the frequency band and the transmission method from an upstream propagation path situation, generates a message including a report content of communication quality information in each mode, and notifies it to the radio terminal unit.

10. The base station apparatus according to claim 8, wherein the radio base station apparatus generates a message including a designation of communication quality information in a narrow band as a report content of the communication quality information and notifies it to the radio terminal unit, when using the second frequency band.

11. The base station apparatus according to claim 8, wherein the radio base station apparatus has a sending power at the frequency band using the beam form transmission in the second frequency band that is greater than or equal to a sending power at the first frequency band and smaller than or equal to a sending power at the frequency band using the space multiplex transmission in the second frequency band.

12. The base station apparatus according to claim 8, wherein the radio base station apparatus provides a channel frame divided by a time and a frequency for a resource at the frequency band using the beam form transmission in the second frequency band, and assigns a specific radio terminal unit to the channel frame or assigns an array weight to an antenna array.

13. The base station apparatus according to claim 8, wherein
- the radio base station apparatus sends, in accordance with a cell center mode (CC mode) in which a frequency used by the radio terminal unit is in the first frequency band or a cell edge mode (CE mode) in which a frequency used by the radio terminal unit is in the second frequency band, measurement report settings including a report content of communication quality information for a reference signal sent by each radio base station apparatus and measured by the radio terminal unit and a transition condition for mode switching between the CC mode and the CE mode to the radio terminal unit,
- the radio terminal unit reports a measurement report indicating a determination result to the radio base station apparatus, if a determination is made that a measurement result of the reference signal satisfies the transition condition as indicated in the measurement report settings, and
- the radio base station apparatus makes scheduling by transiting between the CC mode and the CE mode in accordance with the measurement report, and makes a communication with the radio terminal unit, using either the first frequency band or the second frequency band, based on the scheduling result.

14. The base station apparatus according to claim 8, wherein
- the cell edge mode (CE mode) in which the frequency used by the radio terminal unit is in the second frequency band includes a cell edge-beam form transmission mode (CE-BF mode) and a cell edge-space multiplex transmission mode (CE-SM mode), and
- the radio base station apparatus obtains a predetermined one or more of a moving speed or mobility of the radio terminal unit, quality of a propagation path, or its change, transmission efficiency, and load balance, in accordance with a propagation path situation of an upstream line from the radio terminal unit, determines a transition between the CE-BF mode and the CE-SM mode in accordance with the obtained result, makes a scheduling based on the determination, and makes a communication using the CE-BF mode and the CE-SM mode by further separating the second frequency band.

15. A radio terminal unit in a cellular radio communication system comprising a radio base station apparatus for making any one of a space multiplex transmission and a beam form transmission using a plurality of antennas and the plurality of radio terminal units,
- by each radio base station apparatus,
  - (i) separating communicable frequency band in the cellular radio communication system to:
    - a first frequency band assigned to the radio terminal unit in the cell center, and
    - a second frequency band, assigned to the radio terminal unit on the cell edge;
  - (ii) further using properly the second frequency band by separating to:
    - a beam form transmission of sending the same signal with an array weight multiplied to the plurality of radio terminal units from at least two or more antennas, and
    - a space multiplex transmission of sending a different or independent signal from each of at least two or more antennas to the same radio terminal unit or the plurality of radio terminal units, and
  - wherein the radio terminal unit receives a signal sent from the radio base station in any one of the first and second frequency bands, and in any one of the beam form transmission and the space multiplex transmission, by instruction from the radio base station determined in accordance with a state of each radio terminal unit,
  - wherein the radio terminal unit changes a report content of communication quality information from the radio terminal unit, depending on the specified frequency band and the specified transmission method.

16. The radio terminal unit according to claim 15, wherein the radio terminal unit has a sending power at the frequency band using the beam form transmission in the second frequency band that is greater than or equal to a sending power at the first frequency band and smaller than or equal to a sending power at the frequency band using the space multiplex transmission.

17. The radio terminal unit according to claim 15, wherein the cell edge mode (CE mode) in which the frequency used by the radio terminal unit is in the second frequency band includes a cell edge-beam form transmission mode (CE-BF mode) and a cell edge-space multiplex transmission mode (CE-SM mode).

* * * * *